(12) United States Patent
Son et al.

(10) Patent No.: US 7,570,618 B2
(45) Date of Patent: Aug. 4, 2009

(54) SYSTEM AND METHOD FOR PERFORMING HANDOVER IN A BROADBAND WIRELESS ACCESS COMMUNICATION SYSTEM

(75) Inventors: Jung-Je Son, Seongnam-si (KR); Chang-Hoi Koo, Seongnam-si (KR); Yeong-Moon Son, Anyang-si (KR); Sung-Jin Lee, Suwon-si (KR); So-Hyun Kim, Suwon-si (KR); Hyun-Jeong Kang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 187 days.

(21) Appl. No.: 10/982,935

(22) Filed: Nov. 5, 2004

(65) Prior Publication Data

US 2005/0101328 A1   May 12, 2005

(30) Foreign Application Priority Data

Nov. 7, 2003 (KR) ...................... 10-2003-0078820

(51) Int. Cl.
*H04Q 11/00* (2006.01)
(52) U.S. Cl. ........................ 370/331; 455/437; 455/439
(58) Field of Classification Search ................. 455/436, 455/437, 452.2, 439; 370/331
See application file for complete search history.

(56) References Cited

U.S. PATENT DOCUMENTS 6,167,283 A * 12/2000 Korpela et al. .............. 455/525
6,532,363 B1 * 3/2003 Pussinen ................. 455/435.1
6,597,911 B1   7/2003 Kransmo
6,728,233 B1 * 4/2004 Park et al. .................... 370/342

(Continued)

FOREIGN PATENT DOCUMENTS

CN         1206311         1/1999

(Continued)

OTHER PUBLICATIONS

Chu et al., "A QoS Architecture for the MAC Protocol of IEEE 802.16 BWA System", 2002 IEEE, pp. 435-439.

(Continued)

*Primary Examiner*—Charles Appiah
*Assistant Examiner*—Amancio Gonzalez
(74) *Attorney, Agent, or Firm*—The Farrell Law Firm, LLP

(57) ABSTRACT

Disclosed is a system and a method for controlling a handover of a mobile subscriber station in a broadband wireless access communication system. When serving base station determines to perform a handover of the mobile subscriber station, neighbor base stations to which the mobile subscriber station can be handed over, from among neighbor base stations of the mobile subscriber station, are determined based on a service quality level of service being currently provided to the mobile subscriber station. A handover request signal containing information related to the determined neighbor base station to which the mobile subscriber station can be handed over is transmitted to the mobile subscriber station. The serving base station receives from the mobile subscriber station in response to the request of the handover information about one neighbor base station to which the mobile subscriber station will be handed over, and informs the neighbor base station that the mobile subscriber station will be handed over to the neighbor base station.

31 Claims, 11 Drawing Sheets

U.S. PATENT DOCUMENTS

| | | | |
|---|---|---|---|
| 6,788,941 B2 * | 9/2004 | Needham et al. | 455/442 |
| 6,862,449 B1 * | 3/2005 | Mohebbi et al. | 455/437 |
| 2001/0030953 A1 * | 10/2001 | Chang | 370/331 |
| 2003/0013443 A1 | 1/2003 | Willars et al. | |

FOREIGN PATENT DOCUMENTS

| | | |
|---|---|---|
| EP | 0 888 026 | 12/1998 |
| JP | 11-075237 | 3/1999 |
| KR | 10-2000-011799 | 2/2000 |
| KR | 10-2004-0079659 | 9/2004 |
| RU | 96112146 | 6/1996 |
| RU | 2001111020 | 9/1999 |
| RU | 98123099 | 9/2000 |
| WO | WO 96/08936 | 3/1996 |
| WO | WO 97/44970 | 11/1997 |
| WO | WO 99/59373 | 11/1999 |
| WO | WO 00/18173 | 3/2000 |

OTHER PUBLICATIONS

Chuah et al., "Integrated Dynamic Radio Resource Management", 1995 IEEE, pp. 584-588.

Santhi et al., "Goals of True Broadband's Wireless Next Wave (4G-5G)", 2003 IEEE, pp. 2317-2321.

Changhoi Koo et al., "Enhancement of BS Initiated Handoff Algorithm for 802.16e", IEEE 802.16 Broadband Wireless Access Working Group, Nov. 7, 2003.

Sohyun Kim et al., "Overall HO Procedures for IEEE 802.16", IEEE 802.16 Broadband Wireless Access Working Group, Sep. 4, 2003.

* cited by examiner

SYSTEM AND METHOD FOR PERFORMING HANDOVER IN A BROADBAND WIRELESS ACCESS COMMUNICATION SYSTEM

PRIORITY

This application claims priority to an application entitled "System and Method for Performing Handover In A Broadband Wireless Access Communication System" filed in the Korean Intellectual Property Office on Nov. 7, 2003 and assigned Serial No. 2003-78820, the contents of which are incorporated herein by reference.

BACKGROUND OF THE INVENTION

1. Field of the Invention

The present invention relates to a broadband wireless communication system, and more particularly to a system and a method for performing a handover in a broadband wireless access communication system employing an orthogonal frequency division multiplexing scheme.

2. Description of the Related Art

In the fourth generation ('4G') communication system, which is the next generation communication system, research is being heavily conducted to provide users with services having various qualities of service ('QoS') and supporting a transmission speed of about 100 Mbps. The current third generation ('3G') communication system supports a transmission speed of about 384 kbps in an outdoor channel environment having a relatively unfavorable channel environment, and supports a maximum transmission speed of 2 Mbps even in an indoor channel environment which is a relatively favorable channel environment. A wireless local area network ('LAN') system and a wireless metropolitan area network ('MAN') system generally support transmission speeds of 20 to 50 Mbps. Accordingly, in the current 4G communication system, research is being conducted to develop a new type of communication system for ensuring mobility of terminals and a QoS in the wireless LAN and MAN systems supporting relatively high transmission speeds, and supporting a high speed service to be provided by the 4G communication system.

Since the wireless MAN system has a wide service coverage and supports a high transmission speed, it is suitable for supporting a high speed communication service. However, since the wireless MAN system does not in any way take into consideration the mobility of a user, i.e., a subscriber station ('SS'), the wireless MAN system does not reflect in any way a handover according to high speed movement of the SS. The wireless MAN system is a broadband wireless access (BWA) communication system, which has a wider service coverage and supports a higher transmission speed than the wireless LAN system. The IEEE 802.16a communication system employs an orthogonal frequency division multiplexing ('OFDM') scheme and an orthogonal frequency division multiplexing access ('OFDMA') scheme in order to enable a physical channel of the wireless MAN system to support a broadband transmission network. That is, the IEEE 802.16a communication system is a broadband wireless access communication system employing an OFDM/OFDMA scheme.

The IEEE 802.16a communication system only considers a state in which an SS is currently motionless (i.e., a state in which the mobility of the SS is not entirely considered), and a single cell structure. However, an IEEE 802.16e communication system is stipulated as a system that takes into consideration the mobility of an SS in the IEEE 802.16a communication system. Accordingly, the IEEE 802.16e communication system must consider the mobility of an SS in a multi-cell environment. In order to support the mobility of the SS in a multi-cell environment, changes in operations of the SS and a base station (BS) are necessarily required. In order to support the mobility of the SS, research into a handover of the SS considering a multi-cell structure has been actively pursued. An SS having the mobility will be referred to as a mobile subscriber station ('MSS').

A construction of the IEEE 802.16e communication system will be described with reference to FIG. 1.

FIG. 1 is a diagram illustrating a construction of a conventional IEEE 802.16e communication system.

Referring to FIG. 1, the IEEE 802.16e communication system has a multi-cell structure consisting of a first cell 100 and a second cell 150. Further, the IEEE 802.16e communication system includes a base station 110 controlling cell 100, a base station 140 controlling cell 150, and a plurality of MSSs 111, 113, 130, 151, and 153. The transmission/reception of signals between the base stations 110 and 140 and the MSSs 111, 113, 130, 151, and 153 is executed according to the OFDM/OFDMA scheme. From among the MSSs 111, 113, 130, 151 and 153, the MSS 130 is located in a cell boundary area, i.e., handover area, between cell 100 and cell 150. Accordingly, only when a handover for the MSS 130 is supported, is it possible to support the mobility for the MSS 130.

In the IEEE 802.16e communication system, a certain MSS receives pilot channel signals transmitted from a plurality of base stations, and measures the CINRs (Carrier to Interference and Noise Ratios) of the received pilot channel signals. The MSS then selects a base station, which is the base station that has transmitted a pilot channel signal having the highest CINR from among the CINRs measured, as a base station (i.e., as a serving base station) to which the MSS currently belongs. The MSS recognizes a base station, which transmits a pilot channel signal capable of being favorably received by the MSS, from among base stations having transmitted pilot channel signals as a base station to which the MSS belongs.

As a result, the base station to which the MSS currently belongs becomes a serving base station. The MSS having selected the serving base station receives a downlink frame and an uplink frame transmitted from the serving base station. The structure of the downlink frame of the conventional IEEE 802.16e communication system will be descried with reference to FIG. 2.

FIG. 2 is a diagram illustrating the structure of the downlink frame of the conventional IEEE 802.16e communication system.

The downlink frame includes a preamble portion 200, a broadcast control portion 210, and a plurality of time division multiplex ('TDM') portions 220 and 230. A synchronization signal (i.e., preamble sequence) used to obtain a mutual synchronization between a base station and an MSS is transmitted through the preamble portion 200. The broadcast control portion 210 includes a downlink MAP ('DL_MAP') portion 211 and an uplink MAP ('UL-MAP') portion 213. The DL_MAP portion 211 is a portion through which a DL_MAP message is transmitted. Table 1 shows information elements ('IEs') contained in the DL_MAP message.

TABLE 1

| Syntax | Size | Notes |
|---|---|---|
| DL_MAP_Message_Format( ) { | | |
|   Management Message Type=2 | 8 bits | |
|   PHY Synchronization Field | Variable | See Appropriate PHY specification |
|   DCD Count | 8 bits | |
|   Base Station ID | 48 bits | |
|   Number of DL_MAP Elements n | 16 bits | |
|   Begin PHY specific section { | | See Applicable PHY section |
|     for (i=1;  i<=n;  i++) { | | For each DL_MAP element 1 to n |
|       DL_MAP_Information_Element( ) | Variable | See corresponding PHY specification |
|     If!(byte boundary) { | | |
|       Padding Nibble | 4 bits | Padding to reach byte boundary |
|     } | | |
|     } | | |
|   } | | |
| } | | |

As shown in Table 1, the DL_MAP message includes a plurality of IEs, that is, the 'Management Message Type' representing the type of a transmitted message, the 'PHYsical (PHY) Synchronization' set including a modulation scheme and demodulation scheme information applied to a physical channel in order to obtain a synchronization, the 'DCD count' representing a count corresponding to the configuration variation of a downlink channel descript ('DCD') message containing a downlink burst profile, the 'Base Station ID' representing a base station identifier (BSID), and the 'Number of DL_MAP Elements n' representing the number of elements existing after the Base Station ID. The DL_MAP message also contains information about the ranging codes assigned to each ranging, which will be described later.

The UL_MAP portion 213 is a portion through which an UL_MAP message is transmitted. Table 2 shown below illustrates IEs contained in the UL_MAP message.

TABLE 2

| Syntax | Size |
|---|---|
| UL_MAP_Message_Format( ) { | |
|   Management Message Type=3 | 8 bits |
|   Uplink Channel ID | 8 bits |
|   UCD Count | 8 bits |
|   Number of UL_MAP Elements n | 16 bits |
|   Allocation Start Time | 32 bits |
|   Begin PHY specific section { | |
|     for (i=1;  i<n;  i+n) { | |
|       UL_MAP_Information_Elements { | Variable |
|         Connection ID | |
|         UIUC | |
|         Offset | |
|       } | |
|     } | |
|   } | |
| } | |

As shown in Table 2, the UL_MAP message includes a plurality of IEs, that is, the 'Management Message Type' representing the type of a transmitted message, the 'Uplink Channel ID' representing an uplink channel identifier, the 'UCD count' representing a count corresponding to the configuration variation of an uplink channel descript ('UCD') message containing an uplink burst profile, and the 'Number of UL_MAP Elements n' representing the number of elements existing after the UCD count. Herein, the uplink channel identifier is uniquely assigned in a medium access control ('MAC') sub-layer.

An uplink interval usage code ('UIUC') portion is a portion in which information designating the use of an offset recorded in the offset portion is recorded. For instance, when a value of 2 is recorded in the UIUC portion, it signifies that a starting offset used in the initial ranging is recorded in the offset portion. When a value of 3 is recorded in the UIUC portion, it signifies that a starting offset used in the maintenance ranging or the bandwidth request ranging is recorded in the offset portion. As described above, the offset portion is a portion for recording a starting offset value used in the initial ranging, the bandwidth request ranging, or the maintenance ranging according to the information recorded in the UIUC portion. Further, information about a characteristic of a physical channel to be transmitted in the UIUC portion is recorded in the UCD message.

If an MSS does not successfully perform ranging, the MSS determines a certain backoff value in order to increase the probability of success in the next attempt. The MSS, then, again attempts a ranging process after waiting for the time interval of the backoff value. In this case, the information required for determining the backoff value is also contained the UCD message. The configuration of the UCD message will now be described in more detail with reference to Table 3.

TABLE 3

| Syntax | Size | Notes |
|---|---|---|
| UCD-message_Format( ) { | | |
|   Management Message Type=0 | 8 bits | |
|   Uplink Channel ID | 8 bits | |
|   Configuration Change Count | 8 bits | |
|   Mini-slot size | 8 bits | |
|   Ranging Backoff Start | 8 bits | |
|   Ranging Backoff End | 8 bits | |
|   Request Backoff Start | 8 bits | |
|   Request Backoff End | 8 bits | |
|   TLV Encoded Information for the overall channel | Variable | |
|   Begin PHY Specific Section { | | |
|     for(i=1;  i<n;  i+n) | | |
|       Uplink_Burst_Descriptor | Variable | |
|     } | | |
|   } | | |
| } | | |

As shown in Table 3, the UCD message includes a plurality of IEs, that is, the 'Management Message Type' representing the type of a transmitted message, the 'Uplink Channel ID' representing an uplink channel identifier, the 'Configuration Change Count' counted by a base station, the 'Mini-slot Size' representing the size of a mini-slot of an uplink physical channel, the 'Ranging Backoff Start' representing a start point of a backoff for an initial ranging (i.e., the size of an initial backoff window for the initial ranging), the 'Ranging Backoff End' representing an end point of a backoff for an initial ranging (i.e., the size of a final backoff window), the 'Request Backoff Start' representing a start point of a backoff for 'contention data and requests' (i.e., the size of an initial backoff window), and the 'Request Backoff End' representing an end point of a backoff for 'contention data and requests' (i.e., the size of a final backoff window). The value of the backoff represents a kind of waiting time value for which an MSS must wait for the next ranging when failure occurs in rangings. Further, a base station must transmit the backoff value, which is information relating to a time period for which the MSS must wait for the next ranging, to the MSS when the MSS fails in a ranging. For instance, when a value by the Ranging Backoff Start and the Ranging Backoff End is set to 10, the MSS passes chances in which the MSS can perform rangings of $2^{10}$ times (i.e., 1024 times) according to a truncated binary exponential backoff algorithm and then must perform the next ranging.

In addition, the TDM portions 220 and 230 are portions corresponding to time slots assigned to each MSS by a time division multiplex ('TDM')/time division multiple access ('TDMA') scheme. The base station transmits broadcast information to MSSs managed by the base station through the DL_MAP portion 211 of the downlink frame by means of a preset center carrier. When the MSSs are powered on, each MSS monitors all of the frequency bands set in each MSS itself in advance and detects a pilot channel signal having the highest pilot CINR. The MSS determines a base station having transmitted the pilot channel signal having the highest CINR to be a base station to which the MSS currently belongs. The MSS confirms the DL_MAP portion 211 and the UL_MAP portion 213 of the downlink frame transmitted by the base station, and confirms control information for controlling an uplink and a downlink of the MSS and information representing the actual position of data transmission/reception.

FIG. 3 is a diagram illustrating the structure of the uplink frame of the conventional IEEE 802.16e communication system.

Before describing FIG. 3, rangings used in the IEEE 802.16e communication system, an initial ranging, a maintenance ranging (i.e., periodic ranging), and a bandwidth request ranging will be described in detail.

First, the initial ranging will be described.

The initial ranging is a ranging which is performed when a base station requests the initial ranging in order to obtain synchronization with an MSS. Further, the initial ranging is a ranging which is performed in order to match an exact time offset between the MSS and the base station and adjust the transmit power. That is, the MSS is powered on, receives a DL_MAP message, an UL_MAP message and a UCD message and obtains synchronization with the base station. Then, the MSS performs the initial ranging to adjust the time offset and the transmit power with the base station. Since the IEEE 802.16e communication system employs an OFDM/OFDMA scheme, the ranging procedure requires ranging sub-channels and ranging codes. A base station assigns usable raging codes according to the object of each raging, that is, each kind of raging. This will now be described in detail.

The raging code is generated by segmenting a pseudo-random noise ('PN') sequence having a predetermined length (e.g., length of $2^{15}-1$ bits) by a predetermined unit. Generally, two ranging sub-channels having a length of 53 bits constitute one ranging channel. The raging code is constructed by segmenting a PN code through the ranging channel having a length of 106 bits. The 48 raging codes (i.e., RC#1 to RC#48) (at a maximum of 48 ranging codes per MSS) constructed in this way may be assigned to an MSS, and two raging codes (at a minimum per each MSS) are applied to the three types of rangings, that is, the initial ranging, the periodic ranging and the bandwidth request ranging, as a default value. In this way, different raging codes are assigned to each ranging. For instance, N raging codes are assigned for the initial ranging (N RCs for initial ranging), M raging codes are assigned for the periodic ranging (M RCs for periodic ranging), and L raging codes are assigned for the bandwidth request ranging (L RCs for BW-request ranging). The raging codes assigned in this way are transmitted to the MSSs through the DL_MAP message as described above, and the MSSs perform the ranging procedure by using the raging codes contained in the DL_MAP message according to the objects of the raging code.

Second, the periodic ranging will now be described.

The periodic ranging is a ranging periodically performed when the MSS having adjusted the time offset and the transmit power with the base station through the initial ranging adjusts a channel status, etc., with the base station. The MSS performs the periodic ranging by means of the ranging codes assigned for the periodic ranging.

Third, the bandwidth request ranging will now be described.

The bandwidth request ranging is a ranging performed when the MSS having adjusted the time offset and the transmit power with the base station through the initial ranging requests a bandwidth assignment in order to actually perform a communication with the base station. The bandwidth request ranging may be performed using one selected from among a Grants scheme, a scheme of 'Contention-based Focused bandwidth requests for Wireless MAN-OFDM', and a scheme of 'Contention-based CDMA bandwidth requests for Wireless MAN-OFDMA'. Each of the Grants scheme, the 'Contention-based Focused bandwidth requests for Wireless MAN-OFDM'scheme, and the 'Contention-based CDMA bandwidth requests for Wireless MAN-OFDMA'scheme will be described in detail.

(1) Grants Scheme

The Grants scheme is a scheme for requesting a bandwidth assignment when a communication system to which an MSS currently belongs is a communication system using a single carrier. In this case, the MSS performs the bandwidth request ranging using not its own connection identifier ('CID') but a default CID. When the bandwidth request ranging fails, the MSS again attempts the bandwidth request ranging after a time interval of a backoff value or abandons a received service data unit (SDU), according to the latest information received from the base station and a request condition of the base station. In this case, the MSS already recognizes the backoff value through a UCD message.

(2) 'Contention-Based Focused Bandwidth Requests for Wireless MAN-OFDM' scheme

The 'Contention-based Focused bandwidth requests for Wireless MAN-OFDM' scheme is a scheme for requesting a bandwidth assignment when a communication system to which an MSS currently belongs is a communication system using the OFDM scheme. The 'Contention-based Focused bandwidth requests for Wireless MAN-OFDM' scheme is classified into two schemes. The first scheme is a scheme of performing a bandwidth request ranging in such a manner that an MSS uses a default CID, as described in the description for the Grants scheme, and simultaneously transmits a focused contention transmission message. The second scheme is a scheme of performing a bandwidth request ranging by transmitting a broadcast CID together with an OFDM Focused Contention ID, not using the default CID. When the broadcast CID together with the OFDM Focused Contention ID is transmitted, the base station determines a specific contention channel and a transmission probability for the relevant MSS.

(3)'Contention-Based CDMA Bandwidth Requests for Wireless MAN-OFDMA' scheme

The 'Contention-based CDMA bandwidth requests for Wireless MAN-OFDMA' scheme is a scheme for requesting a bandwidth assignment when a communication system to which an MSS currently belongs is a communication system using the OFDMA scheme. The 'Contention-based CDMA bandwidth requests for Wireless MAN-OFDMA' scheme is also classified into two schemes. The first scheme is a scheme of performing a bandwidth request ranging CID as described in the description about the Grants scheme. The second scheme is a scheme of performing a bandwidth request ranging using a mechanism based on CDMA (Code Division Multiple Access) scheme, that is, using a CDMA based mechanism. In the CDMA based mechanism, since the communication system uses a plurality of tones (i.e., a plurality of sub-channels) made-up with OFDM symbols, the base station applies a mechanism such as the CDMA scheme to each of the sub-channels when an MSS performs a bandwidth request ranging. When the base station successfully receives the bandwidth request ranging, the base station assigns a frequency band through a MAC protocol data unit (PDU) to the MSS having performed the bandwidth request ranging. Meanwhile, in a case of using an REQ (REQuest) Region-Focused scheme, the possibility of a collision increases when a plurality of MSSs attempt bandwidth request rangings using the same contention code through the same sub-channel.

Referring to FIG. 3, the uplink frame includes an 'Initial Maintenance Opportunities' portion 300 for the initial ranging and the maintenance ranging (i.e., periodic ranging), a 'Request Contention Opportunities' portion 310 for the bandwidth request ranging, and an 'MSS scheduled data' portion 320 containing the uplink data of the MSSs. The Initial Maintenance Opportunities portion 300 includes a plurality of access burst intervals actually containing an initial ranging and a periodic ranging, and a collision interval in which collision between access burst intervals occurs. The Request Contention Opportunities portion 310 includes a plurality of bandwidth request intervals contains a bandwidth request ranging and a collision interval in which collision between bandwidth request intervals occurs. Further, the MSS scheduled data portion 320 includes a plurality of MSS scheduled data parts (i.e., MSS 1 scheduled data part to MSS N scheduled data part) and MSS transition gaps each of which is present between the adjacent MSS scheduled data parts.

FIG. 4 is a flow diagram illustrating the first ranging procedure between a base station and an MSS in the conventional IEEE 802.16e communication system. The MSS 400 monitors all of the frequency bands in the MSS 400 in advance and detects a pilot channel signal having the highest CINR. Then, the MSS 400 determines a serving base station 420 having transmitted the pilot channel signal having the highest CINR to be the serving base station 420 (i.e., a serving base station) to which the MSS 400 currently belongs. Then, the MSS 400 receives the preamble of the downlink frame transmitted from the serving base station 420 and obtains a system synchronization with the serving base station 420.

When the system synchronization is obtained between the MSS 400 and the serving base station 420 as described above, the serving base station 420 transmits a DL_MAP message and an UL_MAP message to the MSS 400 in steps 411 and 413, respectively. Herein, as described in Table 1, the DL_MAP message functions to inform the MSS 400 of information required when the MSS 400 obtains a synchronization with the serving base station 420 in a downlink, and information about the structure of a physical channel capable of receiving messages transmitted to the MSS 400 in the downlink. Further, as described in Table 2, the UL_MAP message functions to inform the MSS 400 of information about the scheduling period of an MSS and the structure of a physical channel in an uplink. Meanwhile, the DL_MAP message is periodically broadcast from a base station to all of the MSSs. Herein, when a certain MSS can continuously receive the DL_MAP message, it can be expressed that the MSS has synchronized with the base station.

The MSSs having received the DL_MAP message can receive all of the messages transmitted through a downlink. Further, as described in Table 3, when an MSS fails in an access, the base station transmits the UCD message containing information notifying the MSS of an usable backoff value.

When the MSS 400 having been synchronized with the serving base station 420 performs the ranging, the MSS 400 transmits a ranging request ('RNG_REQ') message to the serving base station 420 in step 415. Then, in step 417, the serving base station 420 having received the RNG_REQ message transmits to the MSS 400 a ranging response ('RNG_RSP') message, which contains information for compensating for frequency, time, and transmit power for the ranging.

Table 4, illustrated below, shows the configuration of the RNG_REQ message.

TABLE 4

| Syntax | Size | Notes |
| --- | --- | --- |
| RNG_REQ_Message_Format( ) { | | |
| Management Message Type=4 | 8 bits | |
| Downlink Channel ID | 8 bits | |
| Pending Until Complete | 8 bits | |
| TLV Encoded Information | Variable | TLV specific |
| } | | |

In Table 4, the 'Downlink Channel ID' represents a downlink channel identifier contained in the RNG_REQ message received in the MSS 400 through the UCD. The 'Pending Until Complete' represents a priority of a transmitted ranging response. That is, when the Pending Until Complete has a value of 0, a previous ranging response has a high priority. In contrast, when the Pending Until Complete has values other than 0, a currently transmitted ranging response has a high priority.

Table 5, illustrated below, shows the configuration of the RNB_RSP message in response to the RNG_REQ message shown in Table 4.

TABLE 5

| Syntax | Size | Notes |
| --- | --- | --- |
| RNG_RSP_Message_Format( ) { | | |
| Management Message Type=5 | 8 bits | |
| Uplink Channel ID | 8 bits | |
| TLV Encoded Information | Variable | TLV specific |
| } | | |

In Table 5, the 'Uplink Channel ID' represents an uplink channel identifier contained in the RNG_REQ message.

In a case of using the OFDMA scheme in the IEEE 802.16e, in order to more efficiently perform the first ranging procedure as described above, a scheme of establishing a dedicated section for the ranging and transmitting ranging codes through the dedicated section may be used, instead of using the RNG_REQ message. A ranging procedure between a base station and an MSS when the scheme of transmitting ranging codes only through the dedicated section will now be described with reference to FIG. 5.

FIG. 5 is a flow diagram illustrating the second ranging procedure between a base station and an MSS in the conventional IEEE 802.16e communication system.

Referring to FIG. 5, the second ranging procedure between the base station and the MSS basically includes the same steps as those of the first ranging procedure described with reference to FIG. 4. However, according to the second ranging procedure, the MSS 500 transmits a ranging code to the serving base station 520 before transmitting the RNG_REQ message in step 515. Then, the serving base station 520 receives the ranging code and then transmits the RNG_RSP message to the MSS 500 in step 517. In step 519, the MSS 500 having received the RNG_RSP message transmits the RNG_REQ message to the serving base station 520 through a contention-free band assigned by the serving base station 520.

Meanwhile, the serving base station inserts response information to the received ranging code into the RNG_RSP message. In this case, information newly-contained in the RNG_RSP message is as follows.
a. Ranging Code: Received ranging CDMA code.
b. Ranging Symbol: OFDM symbol of the received ranging CDMA code.
c. Ranging sub-channel: Sub-channel of the received ranging CDMA code.
d. Ranging frame number: Frame number of the received ranging CDMA code.

SUMMARY OF THE INVENTION

As describe above, although the IEEE 802.16e communication system is a communication system that considers the mobility of an MSS and a multi-cell structure, a definite procedure for a handover of the MSS is not yet proposed. Therefore, it is necessary to develop a definite procedure for a handover of the MSS.

Accordingly, the present invention has been made to solve at least the above-mentioned problems occurring in the prior art, and an object of the present invention is to provide a system and a method for performing a handover of a mobile subscriber station ('MSS') in a broadband wireless access communication system.

Another object of the present invention is to provide a system and a method for performing a handover of an MSS according to the control of a serving base station in a broadband wireless access communication system.

Still another object of the present invention is to provide a system and a method for performing a handover of an MSS according to service levels supportable in a broadband wireless access communication system.

To accomplish these objects, in accordance with one aspect of the present invention, there is provided a system for controlling a handover of a mobile subscriber station by a serving base station in a broadband wireless access communication system which includes the mobile subscriber station, the serving base station for providing service to the mobile subscriber station, and neighbor base stations neighboring the serving base station, the system including a serving base station for determining to perform a handover of a mobile subscriber station, sending neighbor base stations of information related to service including types of the service provided to the mobile subscriber station, receiving information related to types of service which can be provided by the respective neighbor base stations from the neighbor base stations, transmitting to the mobile subscriber station a handover request signal, which contains the information received from the neighbor base stations, receiving information related to one neighbor base station selected by the mobile subscriber station from among the neighbor base stations, and confirming a handover notification to the selected neighbor base station; and a mobile subscriber station for receiving, from the serving base station, a handover request signal containing information received from the neighbor base stations, selecting one neighbor base station from among the neighbor base stations based on the received information and transmitting information related to the selected neighbor base station to the serving base station, and transmitting a handover start signal to the serving base station and performing the handover to the selected neighbor base station.

In accordance with another aspect of the present invention, there is provided a system for controlling a handover of a mobile subscriber station by a serving base station in a broadband wireless access communication system which includes the mobile subscriber station, the serving base station for providing service to the mobile subscriber station, and neighbor base stations neighboring the serving base station, the system including a serving base station for determining to perform a handover of a mobile subscriber station, sending neighbor base stations of information related to types of the service provided to the mobile subscriber station, receiving information related to types of service which can be provided by the respective neighbor base stations from the neighbor base stations, transmitting to the mobile subscriber station a handover request signal, which contains the information received from the neighbor base stations, receiving a response signal from the mobile subscriber station in response to the handover request signal, selecting one neighbor base station based on information related to the neighbor base stations contained in the response signal, and confirming a handover notification to the selected neighbor base station; and a mobile subscriber station for receiving from the serving base station a handover request signal, which contains information received from the neighbor base stations, transmitting a response signal to the serving base station in response to the handover request signal, receiving from the serving base station information related to a neighbor base station to which the mobile subscriber station is handed over, and transmitting a handover start signal to the serving base station and performing the handover to a selected neighbor base station.

In accordance with still another aspect of the present invention, there is provided a method for controlling a handover of a mobile subscriber station by a serving base station in a broadband wireless access communication system which includes the mobile subscriber station, the serving base station for providing service to the mobile subscriber station, and neighbor base stations neighboring the serving base station, the method including the steps of determining to perform a handover of the mobile subscriber station; sending to the neighbor base stations of information related to types of service provided from the serving base station to the mobile subscriber station after determining to perform the handover of the mobile subscriber station; receiving from the neighbor base stations information related to types of service which can be provided by the respective neighbor base stations; transmitting to the mobile subscriber station a handover request signal, which contains the information received from the neighbor base stations, receiving from the mobile subscriber station a handover response signal indicating one neighbor base station selected by the mobile subscriber station from among the neighbor base stations; and sending a handover notification confirm signal to the selected neighbor base station.

In accordance with still another aspect of the present invention, there is provided a method for controlling a handover of a mobile subscriber station by the mobile subscriber station in a broadband wireless access communication system which includes the mobile subscriber station, a serving base station for providing service to the mobile subscriber station, and neighbor base stations neighboring the serving base station, the method including the steps of receiving from the serving base station a handover request signal, which contains information received from the neighbor base stations selecting one neighbor base station from among the neighbor base stations based on the received information and transmitting to the serving base station response signal indicating the selected neighbor base station; and transmitting a handover start signal to the serving base station and performing the handover to the selected neighbor base station.

In accordance with still another aspect of the present invention, there is provided a method for controlling a handover of a mobile subscriber station by a serving base station in a broadband wireless access communication system which includes the mobile subscriber station, the serving base station for providing service to the mobile subscriber station, and neighbor base stations neighboring the serving base station, the method including the steps of determining to perform a handover of the mobile subscriber station; sending to the neighbor base stations information related to types of the service provided from the serving base station to the mobile subscriber station after determining to perform the handover of the mobile subscriber station; receiving from the neighbor base stations information related to types of service which can be provided by the respective neighbor base stations; transmitting to the mobile subscriber station a handover request signal, which contains the information received from the neighbor base stations; receiving a response signal from the mobile subscriber station in response to the handover request signal; selecting one neighbor base station based on the information related to the neighbor base stations contained in the response signal; and confirming handover notification to the selected neighbor base station.

In accordance with still another aspect of the present invention, there is provided a method for controlling a handover of a mobile subscriber station by the mobile subscriber station in a broadband wireless access communication system which includes the mobile subscriber station, a serving base station for providing service to the mobile subscriber station, and neighbor base stations neighboring the serving base station, the method including the steps of receiving from the serving base station a handover request signal, which contains information received from the neighbor base stations; transmitting to the serving base station a response signal in response to the handover request signal; receiving from the serving base station information related to a neighbor base station to which the mobile subscriber station is handed over; and transmitting to the serving base station a handover start signal and performing the handover to a selected neighbor base station.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of a system and a method for performing a handover in a broadband wireless access communication system according to the present invention will be described with reference to the accompanying drawings. In the following description of the present invention, a detailed description of known functions and configurations incorporated herein will be omitted when it may obscure the subject matter of the present invention.

Figure 1:
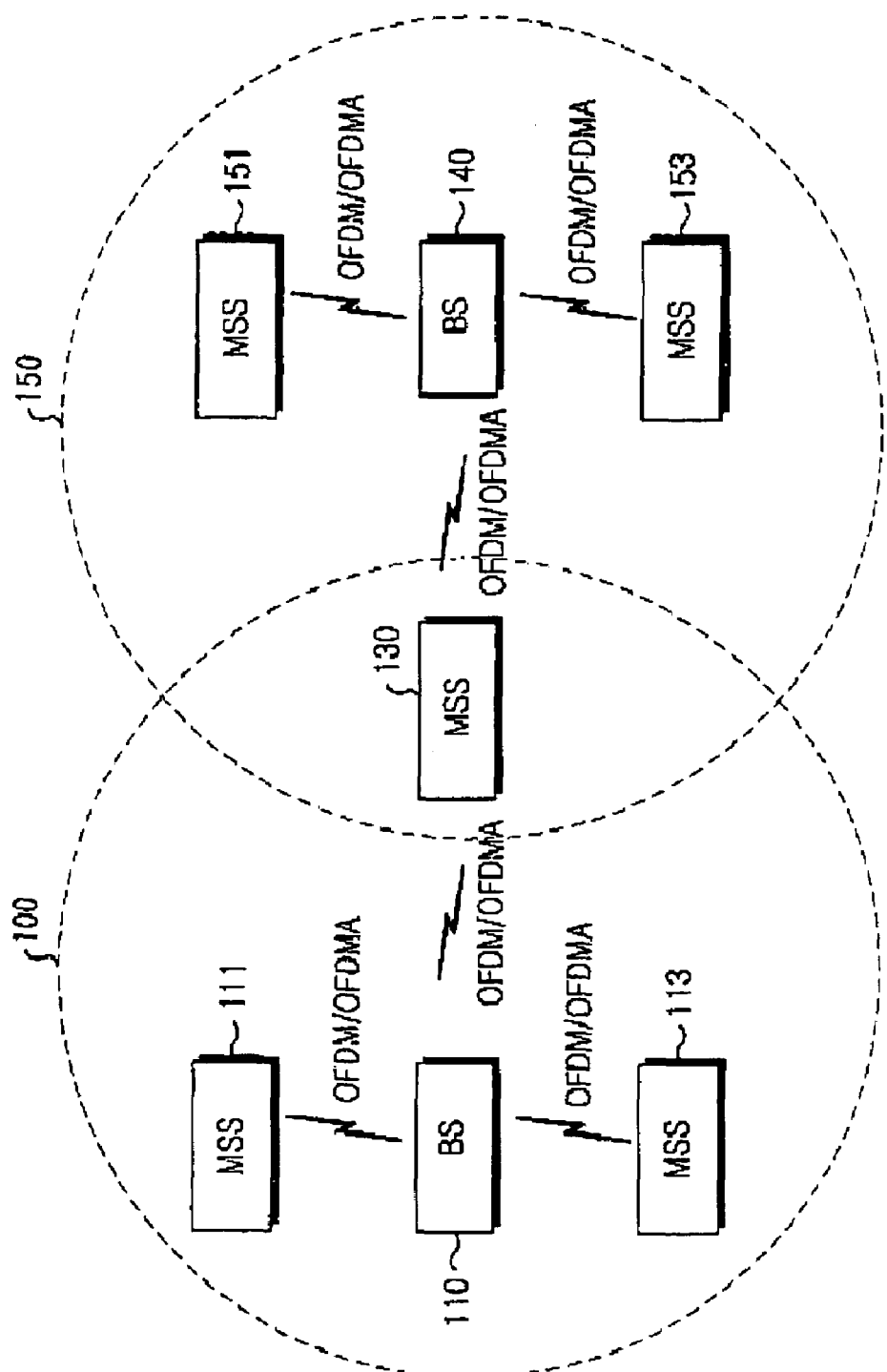
FIG. 1 is a diagram illustrating a construction of a conventional IEEE 802.16e communication system.
Figure 2:
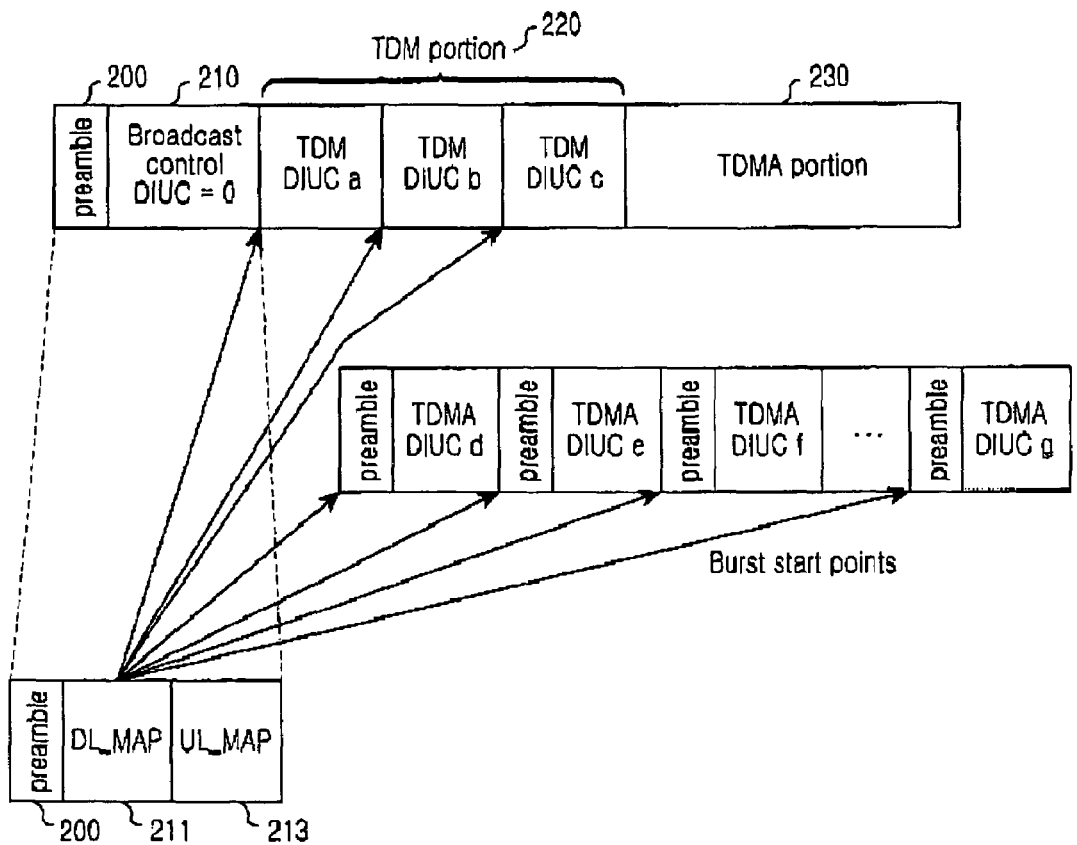
FIG. 2 is a diagram illustrating the structure of the downlink frame of the conventional IEEE 802.16e communication system.
Figure 3:
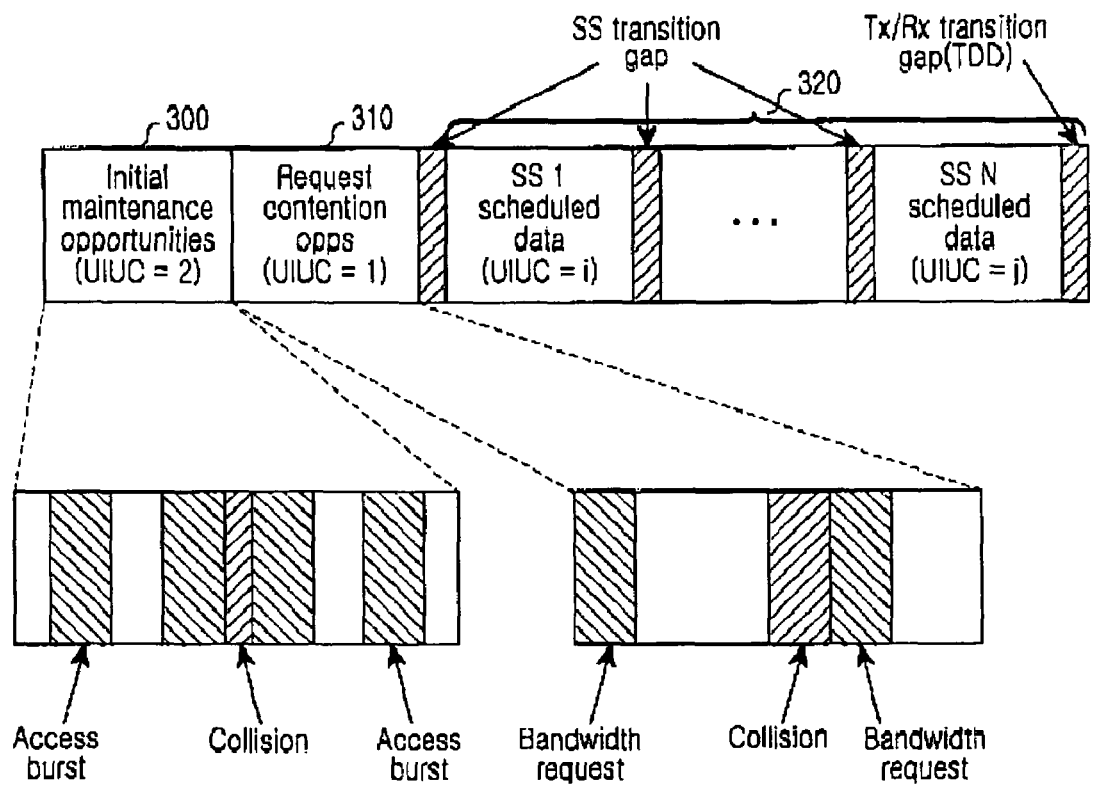
FIG. 3 is a diagram illustrating the structure of the uplink frame of the conventional IEEE 802.16e communication system.
Figure 4:
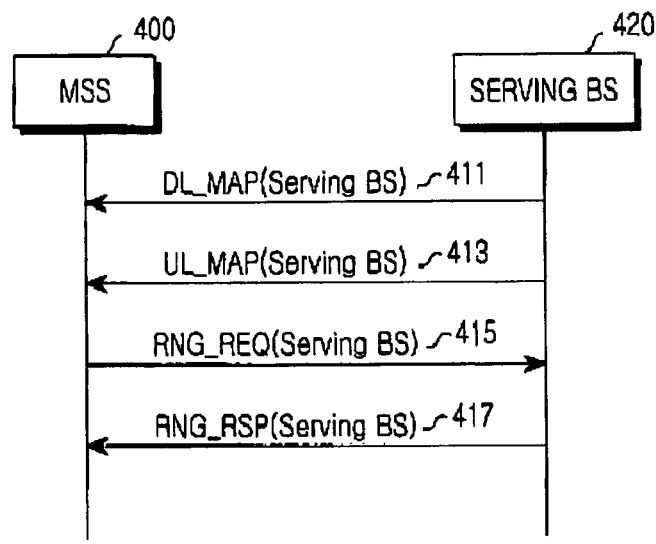
FIG. 4 is a flow diagram illustrating the first ranging procedure between a base station and an MSS in the conventional IEEE 802.16e communication system.
Figure 5:
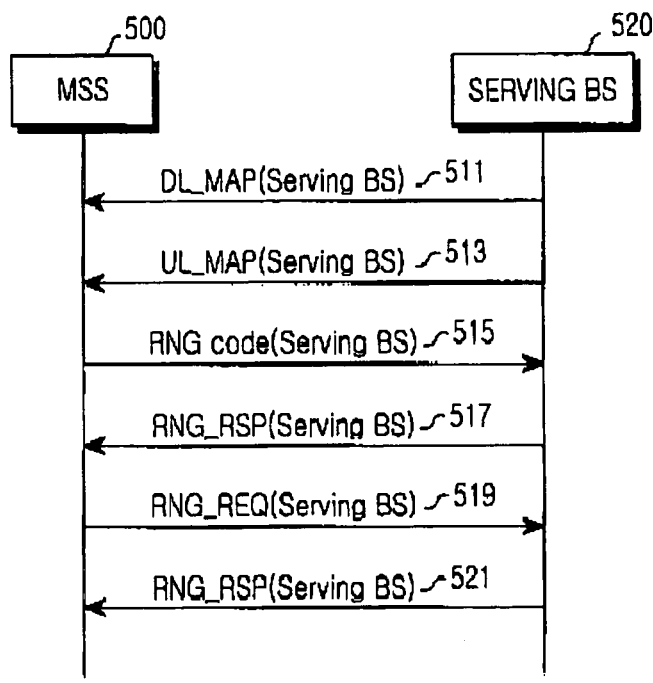
FIG. 5 is a flow diagram illustrating the second ranging procedure between a base station and an MSS in the conventional IEEE 802.16e communication system.
Figure 6:
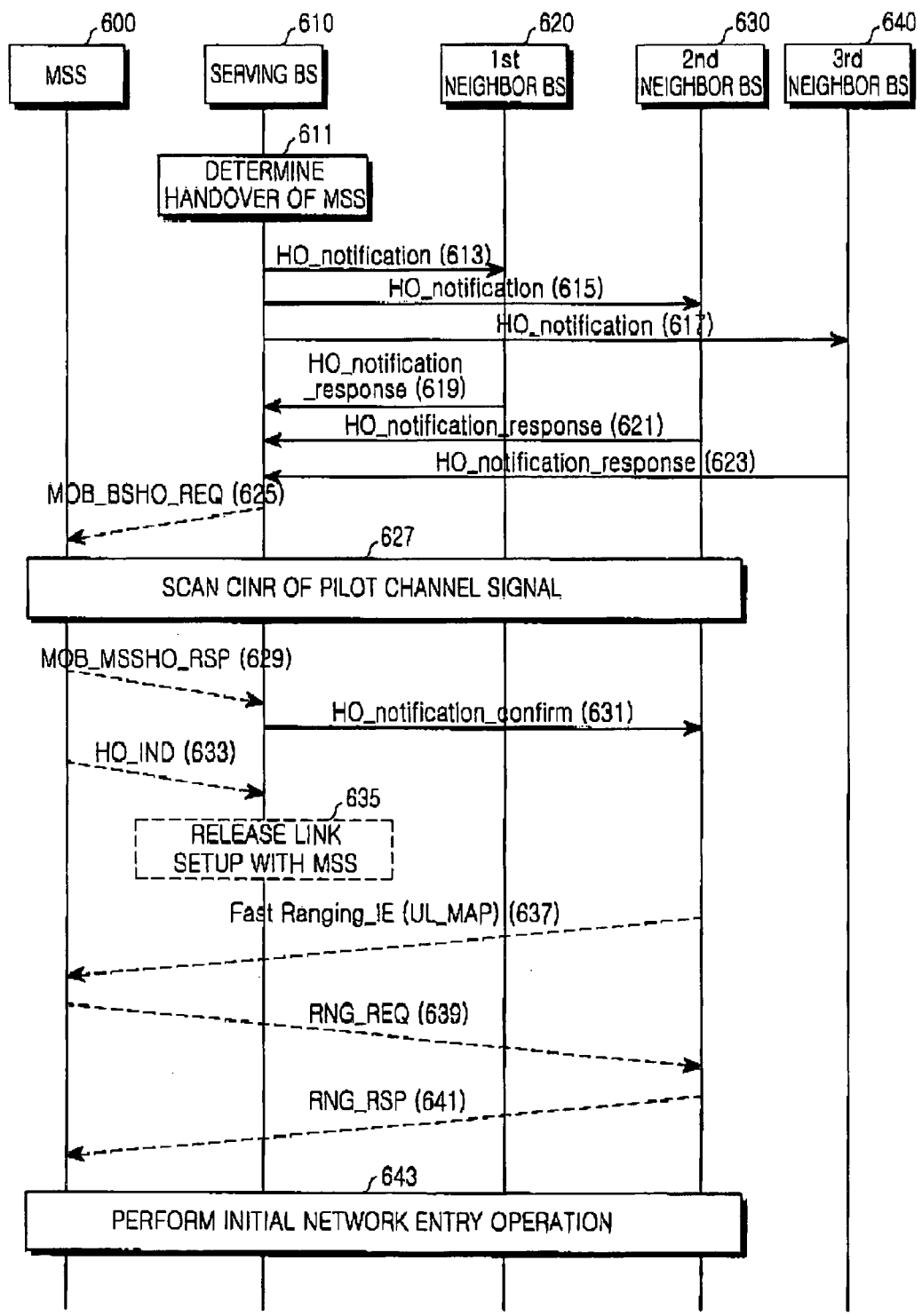
FIG. 6 is a flow diagram illustrating a handover procedure resulting from the request of a serving base station according to the first embodiment of the present invention.

FIG. 6 is a flow diagram illustrating a handover procedure resulting from the request of a serving base station according to the first embodiment of the present invention.

First, it should be noted that the present invention can be applied to all broadband wireless access (BWA) communication systems, although the following description is given for an IEEE (Institute of Electrical and Electronics Engineers) 802.16e communication system, which is one of the broadband wireless access communication systems, for convenience of description. A mobile subscriber station ('MSS') 600 receives pilot channel signals transmitted from a plurality of base stations, which is not illustrated in FIG. 6. The MSS 600 measures carrier-to-interference-and-noise ratios ('CINRs') of the received pilot channel signals. The MSS 600 selects a base station, which has transmitted a pilot channel signal having the highest CINR from among the CINRs measured with the pilot channel signals, as a base station to which the MSS 600 belongs, that is, as a serving base station.

The serving base station 610 transmits a mobile neighbor advertisement ('MOB_NBR_ADV') message to the MSS 600. The MSS 600 can acquire information related to neighbor base stations by receiving the MOB_NBR_ADV message. Information elements ('IEs') contained in the MOB_NBR_ADV message are shown in Table 6.

TABLE 6

| Syntax | Size | Notes |
|---|---|---|
| MOB_NBR_ADV_Message_Format( ) { | | |
|   Management Message Type = 48 | 8 bits | |
|   Configuration Change Count | 8 bits | |
|   N_Neighbors | 8 bits | |
|   For (j=0;j< N_Neighbors;j++){ | | |
|     Neighbor BS-ID | 48 bits | |
|     Physical Frequency | 32 bits | |
|     TLV Encoded Neighbor Information | Variable | TLV specific |
|   } | | |
| } | | |

As shown in Table 6, the MOB_NBR_ADV message includes a plurality of IEs, that is, the 'Management Message Type' representing the type of a transmitted message, the 'Configuration Change Count' representing the number of changed configurations, the 'N_NEIGHBORS' representing the number of neighbor base stations, the 'Neighbor BS-ID' representing identifiers (IDs) of the neighbor base stations, the 'Physical Frequency' representing a physical channel frequency of the neighbor base station, and other information related to the neighbor base station besides the above-mentioned information, that is, other neighbor information (TLV Encoded Neighbor Information) representing information about a physical channel. In this case, when the Configuration Change Count has a value equal to a previous value, it signifies that a currently-received MOB_NBR_ADV message contains the same contents as those of a previously-received MOB_NBR_ADV message. In contrast, when the Configuration Change Count has a different value from a previous value, it signifies that a currently-received MOB_NBR_ADV message contains different contents from those of a previously-received MOB_NBR_ADV message.

In a state in which the MSS 600 recognizes information about neighbor base stations as described above, the serving base station 610 determines a handover of the MSS 600. In this case, the determination of a handover of the MSS 600 in the serving base station 610 may be performed to distribute the load of the serving base station 610. After the serving base station 610 determines the handover of the MSS 600, the serving base station 610 transmits a handover notification ('HO_notification') message to each of neighbor base stations of the MSS 600, for instance, a first neighbor base station 620, a second neighbor base station 630, and a third neighbor base station 640 in steps 613, 615 and 617. The configuration of the HO_notification message is shown in Table 7.

TABLE 7

| Field | Size | Notes |
|---|---|---|
| Global Header | 152-bit | |
| For (j=0;j< Num Records; j++){ | | |
|   MSS unique identifier | 48-bit | 48-bit unique identifier used by MSS (as provided by the MSS or by the I-am-host-of message) |
|   Estimated Time to HO | 16-bit | In milliseconds, relative to the time stamp, value 0 of this parameter indicates that no actual HO is pending |
|   Required BW | 8-bit | Bandwidth which is required by MSS (to guarantee minimum packet data transmission) |
|   Required QoS | 8-bit | Name of Service Class representing Authorized QoSparamSet |
| } | | |
| Security field | TBD | A means to authenticate this message |
| CRC field | 32-bit | IEEE CRC-32 |

As shown in Table 7, the HO_notification message includes a plurality of IEs, that is, the an identifier (i.e., MSS unique identifier) of the MSS 600 to be handed over to a neighbor base station, that is, the first neighbor base station 620, the second neighbor base station 630, or the third neighbor base station 640, an expected start time of a handover of the MSS 600, information related to a bandwidth and a quality of service ('QoS') level requested from the MSS 600 to a new neighbor base station, that is, to a target base station, etc. Herein, the bandwidth represents a bandwidth required to provide a service which is being provided from the serving base station 610 to the MSS 600.

Each of the first neighbor base station 620, the second neighbor base station 630, and the third neighbor base station 640 having received the HO_notification message transmits a handover notification response ('HO_notification_response') message to the serving base station 610 in response to the HO_notification message in steps 619, 621, and 623. The configuration of the HO_notification_response message is shown in Table 8.

TABLE 8

| Field | Size | Notes |
|---|---|---|
| Global Header | 152-bit | |
| For (j=0;j< Num Records; j++){ | | |
|   MSS unique identifier | 48-bit | 48-bit unique identifier used by MSS (as provided by the MSS or by the I-am-host-of message) |
|   QoS Estimated | 8-bit | Bandwidth which is provided by BS (to guarantee minimum packet data transmission) TBD how to set this field |
|   BW Estimated | 8-bit | Quality of Service level Unsolicited Grant Service (UGS) Real-time polling Service (rtPS) Non-real-time polling Service nrtPS) Best effort |
|   ACK/NACK | 1-bit | Acknowledgement or Negative acknowledgement 1 is Acknowledgement which means that the neighbor BS accepts the HO_notification message from the serving BS 0 is Negative Acknowledgement |

TABLE 8-continued

| Field | Size | Notes |
|---|---|---|
| | | which means that the neighbor BS may not accept the HO_notification message from the serving BS |
| } | | |
| Security field | TBD | A means to authenticate this message |
| CRC field | 32-bit | IEEE CRC-32 |

As shown in Table 8, the HO_notification_response message includes a plurality of IEs, that is, an identifier of an MSS to be handed over to a neighbor base station, the 'ACK/NACK' response representing whether or not the neighbor base stations can perform a handover according to the request of the MSS, and a bandwidth and a QoS level to be provided by each neighbor base station when the MSS is handed over to a correspondent neighbor base station.

When the serving base station 610 has received the HO_notification_response message from each of the neighbor base stations 620, 630, and 640, the serving base station 610 determines that each of the neighbor base stations 620, 630, and 640 can provide the service which is being provided by the serving base station 610, with reference to the received HO_notification_response messages. According to a result of the determination of service provision, the serving base station 610 transmits a base station handover request ('MOB_BSHO_REQ') message to the MSS 600 in step 625. That is, the serving base station 610 selects the neighbor base stations to which the MSS 600 can be handed over to in advance with reference to the HO_notification_response messages received from each of the neighbor base stations 620, 630, and 640. In the following description, it is assumed that the serving base station 610 determines that only the first and second neighbor base stations 620 and 630 are to be neighbor base stations to which the MSS 600 can be handed over. The configuration of the MOB_BSHO_REQ message is shown in Table 9.

TABLE 9

| Syntax | Size | Notes |
|---|---|---|
| MOB_BSHO_REQ_Message_Format( ) { | | |
| Management Message Type=51 | 8 bits | |
| N_Recommended | 8 bits | |
| For (j=0;j< N_NEIGHBORS;j++){ | | |
| Neighbor BS-ID | 48 bits | |
| Service level prediction | 8 bits | |
| } | | |
| } | | |

As shown in Table 9, the MOB_BSHO_REQ message contains the 'N_Recommended' field which contains information related to neighbor base stations to which the MSS 600 can be handed over, from among the neighbor base stations of the MSS 600, taking into consideration the service which is currently being provided to the MSS 600. The N_Recommended information includes identifiers (Neighbor BS-IDs) of neighbor base stations to which the MSS 600 can be handed over and service level prediction information. The serving base station 610 may configure the MOB_BSHO_REQ message such that the neighbor base stations are ordered according to the priority of the service level prediction. The service level prediction information indicates the quantity of service which can be provided by the neighbor base stations from among the services currently being provided to the MSS 600. The service level prediction information may be defined as follows.

Service Level Prediction=2: it is possible to provide all of the services.

Service Level Prediction=1: it is possible to provide a portion of the services.

Service Level Prediction=0: it is not possible to provide any of the services.

The MSS 600 having received the MOB_BSHO_REQ message scans the CINRs of the pilot channel signals of neighbor base stations, that is, the first and second neighbor base stations 620 and 630, recorded in the MOB_BSHO_REQ message in step 627. Whether the CINR of the pilot channel signal is measured or 'a scanning for the CINR of the pilot channel signal is scanned or performed, both results is determing the CINR. In addition, when the MSS 600 receives the MOB_BSHO_REQ message in which neighbor base stations are ordered according to the priority of the service level prediction as described above, the MSS 600 scans the CINRs of the pilot channel signals of the neighbor base stations according to the priority. Thereafter, the MSS 600 transmits to the serving base station 610 an MSS handover response ('MOB_MSSHO_RSP') message in which the scanned CINRs of the pilot channel signals of the neighbor base stations are contained in step 629.

A procedure in which the MSS 600 measures the CINRs of the pilot channel signals of the neighbor base stations according to the reception of the MOB_BSHO_REQ message and transmits an MSS handover response ('MOB_MSSHO_RSP') message including the result of the measurement to the serving base station 610 will be described in detail later. The MSS 600 may select a target base station to which the MSS 600 is handed over with reference to the measurement result of the CINRs of the pilot channel signals of the neighbor base stations and/or the Service Level Prediction. In this case, the MSS 600 transmits to the serving base station 610 the MOB_MSSHO_RSP message including an identifier and/or the CINR with respect to the selected target base station.

The configuration of the MOB_MSSHO_RSP message is shown in Table 10.

TABLE 10

| Syntax | Size | Notes |
|---|---|---|
| MOB_MSSHO_RSP_Message_Format( ) { | | |
| Management Message Type = 52 | 8 bits | |
| N_Recommended | 8 bits | |
| For (j=0;j< N_Neighbors;j++){ | | |
| Neighbor BS-ID | 48 bits | |
| BS S/(N+1) | 8 bits | |
| Service level prediction | 8 bits | |
| } | | |
| } | | |

As shown in Table 10, the MOB_MSSHO_RSP message includes the CINRs of the neighbor base stations measured by the MSS 600 and the Service Level Prediction information of neighbor base stations which is recognized through the reception from the serving base station 610. That is, the Service Level Prediction has the same value as that of the Service Level Prediction included in the MOB_BSHO_REQ message. When the MSS 600 selects a target base station as described above, a measured result for the CINR with respect to the selected target base station, instead of measured result for the CINRs of neighbor base stations included in the MOB_BSHO_REQ message, is contained in the MOB_MSSHO_RSP message. In FIG. 6, it is assumed that the MSS 600 selects the second neighbor base station 630 as a target base station.

When the serving base station 610 receives the MOB_MSSHO_RSP message, the serving base station 610 recognizes that a target base station to which the MSS 600 will be handed over to is the second neighbor base station 630 and transmits in step 631 a handover notification confirmation ('HO_notification_confirm') message representing that the MSS 600 will be handed over to the second neighbor base station 630. The configuration of the HO_notification_confirm message is shown in Table 11.

TABLE 11

| Field | Size | Notes |
| --- | --- | --- |
| Global Header | 152-bit | |
| For (j=0;j< Num Records; j++){ | | |
| MSS unique identifier | 48-bit | 48-bit universal MAC address of the MSS (as provided to the BS on the RNG-REQ message) |
| QoS Estimated | 8-bit | Bandwidth which is provided by BS (to guarantee minimum packet data transmission) TBD how to set this field |
| BW Estimated | 8-bit | Quality of Service level Unsolicited Grant Service (UGS) Real-time polling Service (rtPS) Non-real-time polling Service (nrtPS) Best Effort Service (BE) |
| } | | |
| Security field | TBD | A means to authenticate this message |
| CRC field | 32-bit | IEEE CRC-32 |

As shown in Table 11, the HO_notification_confirm message includes a plurality of IEs, that is, the identifier of the MSS to be handed over to the selected target base station, and the bandwidth and the QoS level information requested by the MSS 600 to the target base station when the MSS 600 is handed over to the target base station. When the second neighbor base station 630 receives the HO_notification_confirm message, the second neighbor base station 630 may assign a frequency band or/and a ranging code to the MSS 600 to enable the MSS 600 to transmit the RNG_REQ message through an UL_MAP message for a predetermined period of time so that the MSS 600 can perform a fast handover to the second neighbor base station 630. Assigning a frequency band or/and a ranging code so that the MSS 600 can transmit the RNG_REQ message is defined as assigning 'Fast Ranging_IE'.

The MSS 600 transmits a handover indication ('HO_IND') message to the serving base station 610, thereby informing the serving base station 610 that the MSS 600 starts a handover procedure to the second neighbor base station 630 which is a target base station in step 633. The configuration of the HO_IND message is shown in Table 12.

TABLE 12

| Syntax | Size | Notes |
| --- | --- | --- |
| HO_IND_Message_Format( ) { | | |
| Management Message Type = 54 | 8 bits | |
| Reserved | 6 bits | reserved; shall be set to zero |
| HO_IND_Type | 2 bits | 00: Serving BS release 01: HO cancel |

TABLE 12-continued

| Syntax | Size | Notes |
| --- | --- | --- |
| | | 10: HO reject 11: reserved |
| TLV Encoded Neighbor Information Target_BS_ID | Variable 48 bits | TLV specific |
| } | | |

As shown in Table 12, the HO_IND message includes a plurality of IEs, that is, the 'Management Message Type' representing the type of the transmitted message, an identifier of the target base station finally-selected by the MSS, and other information (e.g., TLV Encoded Information) representing information other than the above-mentioned information.

The serving base station 610 having received the HO_IND message from the MSS 600 releases a link currently-setup with the serving base station 610 in step 635. In this way, when the link between the MSS 600 and the serving base station 610 is released, the MSS 600 performs a handover to the second neighbor base station 630. That is, the MSS 600 receives an UL_MAP message including a Fast_Ranging_IE transmitted from the second neighbor base station 630 in step 637, and then transmits an RNG_REQ message to the second neighbor base station 630 using the Fast_Ranging_IE in step 639. The second neighbor base station 630 having received the RNG_REQ message transmits to the MSS 600 a ranging response ('RNG_RSP') message which includes information about compensation for frequency, time, and transmission power for the ranging in step 641. The MSS 600 having received the RNG_RSP message in this way performs an initial network entry operation with the second neighbor base station 630 in step 643.

Figure 7:
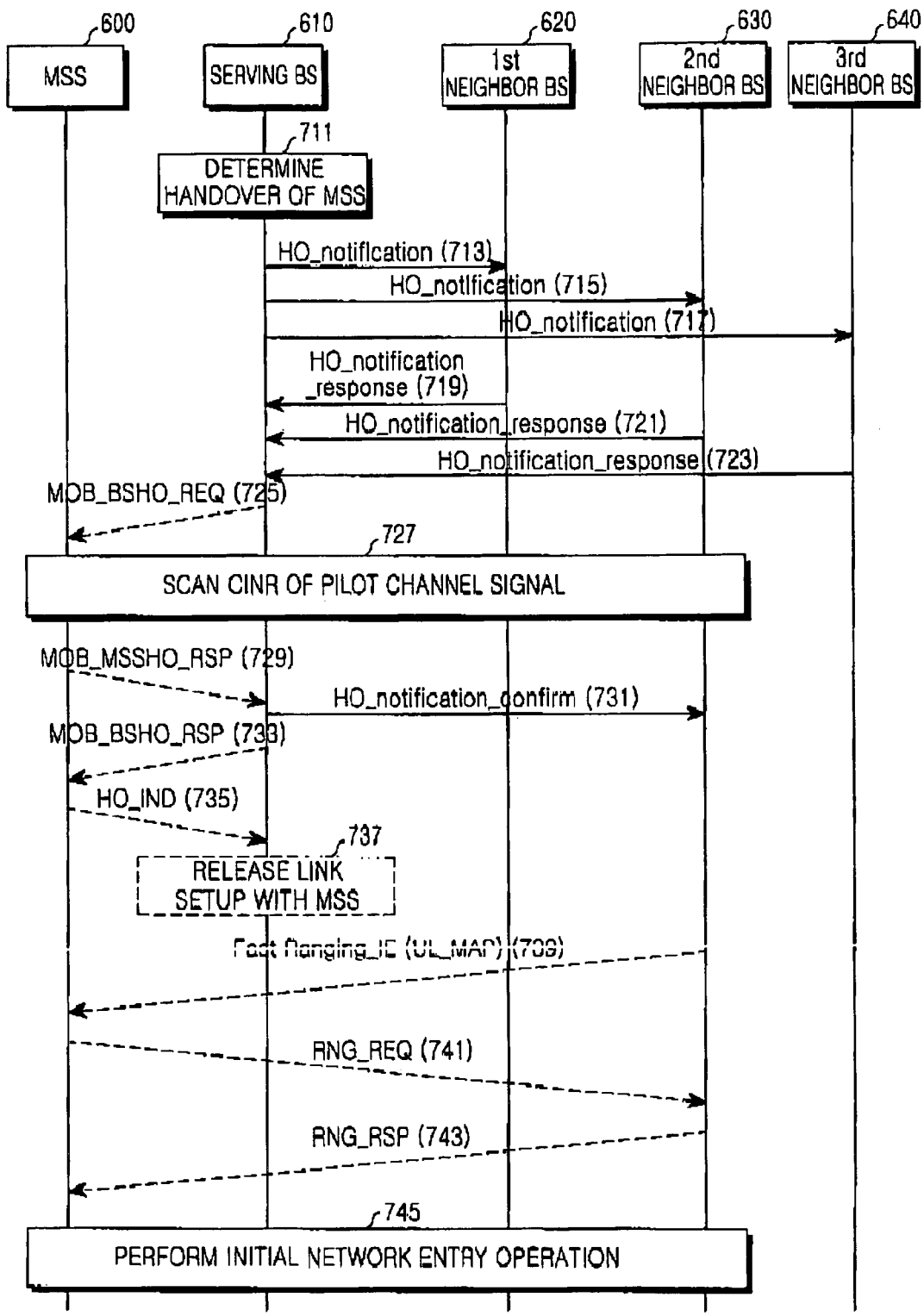
FIG. 7 is a flow diagram illustrating a handover procedure resulting from the request of a serving base station according to the second embodiment of the present invention.

FIG. 7 is a flow diagram illustrating a handover procedure resulting from the request of a serving base station according to the second embodiment of the present invention.

Referring to FIG. 7, the handover procedure illustrated in FIG. 7 basically includes the same steps as those included in the handover procedure described with reference to FIG. 6, but is different in that the serving base station 610 selects a target base station to which the MSS 600 will be handed over to as compared with the handover procedure illustrated in FIG. 6. That is, operations for steps 711 to 727 illustrated in FIG. 7 are the same as those of steps 611 to 627 illustrated in FIG. 6, and also operations for steps 735 to 745 illustrated in FIG. 7 are the same as those of steps 633 to 643 illustrated in FIG. 6. However, since FIG. 7 illustrates a case in which it is not the MSS 600 but the serving base station 610 that selects a target base station, the handover procedure illustrated in FIG. 7 further includes a step of transmitting a base station handover response ('MOB_BSHO_RSP') message to notify the MSS 600 of a target base station selected by the serving base station 610. In addition, the operation of step 729 is different from the operation of step 629 described with reference to FIG. 6.

The MSS 600 inserts the CINRs of the pilot channel signals and/or the Service Level Predictions of the neighbor base stations, the first and second neighbor base stations 620 and 630, to which the MSS 600 can be handed over, into an MOB_MSSHO_RSP message, and transmits the MOB_MSSHO_RSP message to the serving base station 610 in step 729. The serving base station 610 selects a target base station to which the MSS 600 will be handed over, with reference to the CINRs of the pilot channel signals and the Service Level Predictions of the first and second neighbor base stations 620 and 630, which are contained in the MOB_MSSHO_RSP message. In the handover procedure illustrated in FIG. 7, it is also assumed that the second neighbor base station 630 is selected as a target base station, like that in the case illustrated in FIG. 6. Then, in step 733, the serving base station 610 transmits to the MSS 600 a MOB_BSHO_RSP message representing that the second neighbor base station 630 is selected as a target base station. The configuration of the MOB_BSHO_RSP message is shown in Table 13.

TABLE 13

| Syntax | Size | Notes |
|---|---|---|
| MOB_BSHO_RSP_Message_Format( ) { | | |
| Management Message Type = 53 | 8 bits | |
| HO_Type | 1 bit | 0: suggesting HO<br>1: forcing HO |
| Estimated HO time | 8 bits | |
| N_Recommended | 8 bits | |
| For (j=0;j< N_Neighbors;j++){ | | |
| Neighbor BS-ID | 48 bits | |
| Service Level Prediction | 8 bits | |
| } | | |
| } | | |

As shown in Table 13, the MOB_BSHO_RSP message includes a plurality of IEs, that is, the 'Management Message Type' representing the type of a transmitted message, an expected start time of a handover procedure, and information about a target base station selected by the serving base station.

Figure 8:
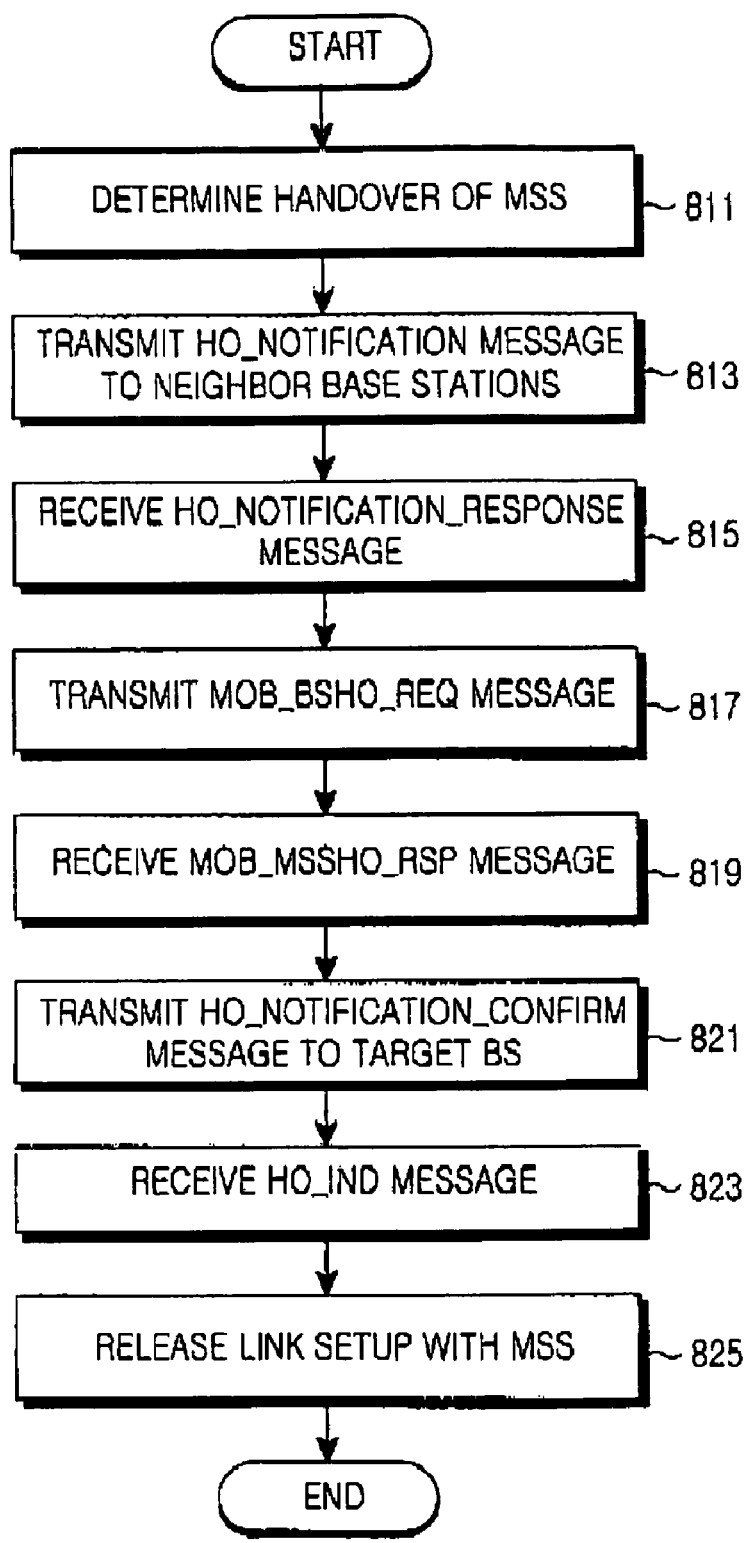
FIG. 8 is a flowchart illustrating an operation procedure of a serving base station for performing a handover according to the first embodiment of the present invention.

FIG. 8 is a flowchart illustrating an operation procedure of a serving base station for performing a handover according to the first embodiment of the present invention.

First, in step 811, the serving base station 610 determines a handover of the MSS 600 and then proceeds to step 813. In step 813, the serving base station 610 transmits an HO_notification message to neighbor base stations, that is, a first neighbor base station 620, a second neighbor base station 630, and a third neighbor base station 640 of the MSS 600 and then proceeds to step 815. In step 815, the serving base station 610 receives HO_notification_response messages from the first, second, and third neighbor base stations 620, 630, and 640 in response to the HO_notification message and then proceeds to step 817. In step 817, the serving base station 610 selects the neighbor base stations, that is, the first and second neighbor base stations 620 and 630 to which the MSS 600 can be handed over, with reference to Service Level Predictions received from the first, second, and third neighbor base stations 620, 630, and 640, transmits a MOB_BSHO_REQ message containing information related to the selected first and second neighbor base stations 620 and 630 to the MSS 600, and proceeds to step 819.

In step 819, the serving base station 610 receives from the MSS 600 an MOB_MSSHO_RSP message including information related to the second neighbor base station 630 which is a target base station and then proceeds to step 821. According to the first embodiment of the present, since the MSS 600 selects a target base station, the MOB_MSSHO_RSP message includes information related to the second neighbor base station 630 which is a target base station selected by the MSS 600. In step 821, the serving base station 610 transmits an HO_notification_confirm message to the second neighbor base station 630 and then proceeds to step 823. In step 823, the serving base station 610 receives an HO_IND message from the MSS 600 and then proceeds to step 825. The serving base station 610 having received the HO_IND message recognizes that the MSS 600 has been handed over to the second neighbor base station 630 and releases a link currently-setup with the MSS 600 in step 825, thereby ending the operation procedure.

Figure 9:
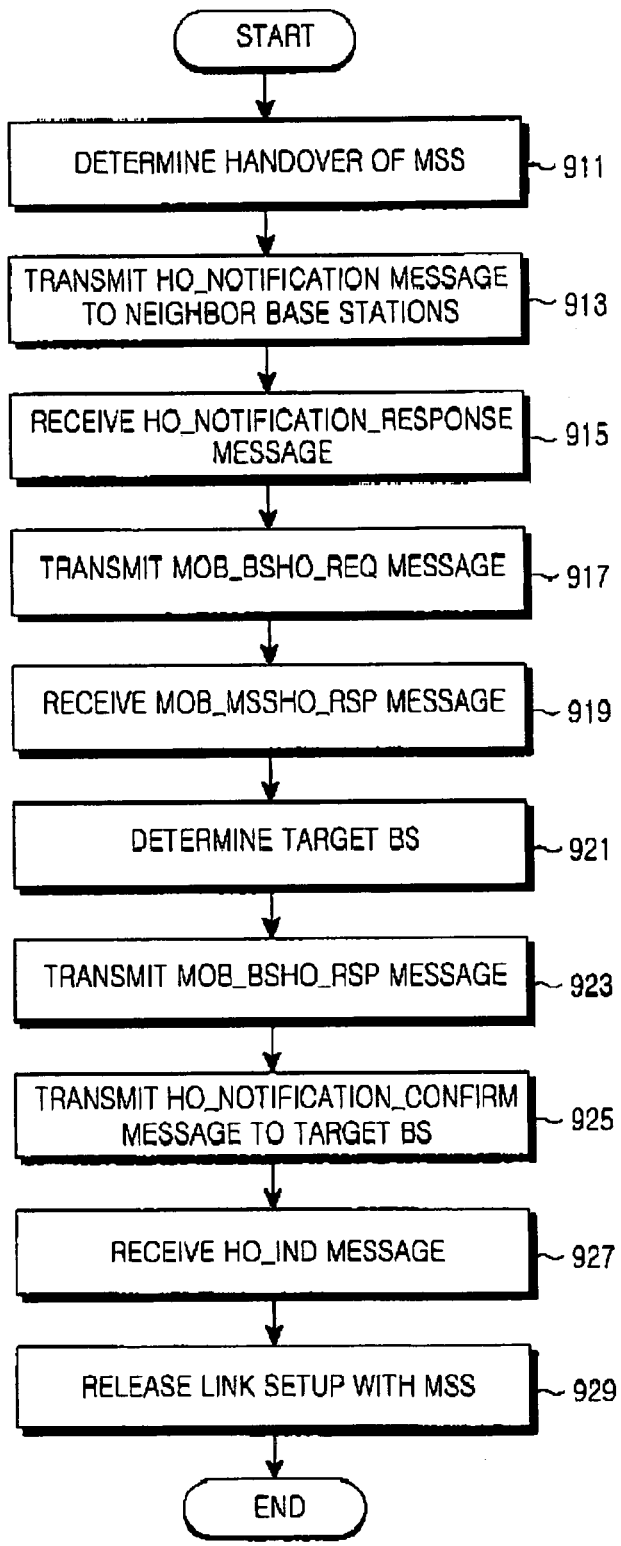
FIG. 9 is a flowchart illustrating an operation procedure of a serving base station for performing a handover according to the second embodiment of the present invention.

FIG. 9 is a flowchart illustrating an operation procedure of a serving base station for performing a handover according to the second embodiment of the present invention.

Before a description of FIG. 9, it should be noted that the first embodiment and the second embodiment of the present invention include basically the same operation steps. A difference between the two embodiments is whether a target base station, to which the MSS 600 will be handed over, is determined by the MSS 600 itself or by the serving base station 610. Therefore, the operation procedure of the serving base station 610 illustrated in FIG. 9 is basically the same as that of the serving base station 610 described with reference to FIG. 8, but is different in determining a target base station as compared with that of FIG. 8. That is, the operations for steps 911 to 917 illustrated in FIG. 9 are the same as those of steps 811 to 817 described with reference to FIG. 8, and also the operations for steps 925 to 929 illustrated in FIG. 9 are the same as those of steps 821 to 825 described with reference to FIG. 8.

In FIG. 9, since a target base station is selected by the serving base station 610 and not by the MSS 600 as in FIG. 8, the serving base station 610 receives an MOB_MSSHO_RSP message including the CINRs of the pilot channel signals and/or Service Level Predictions of all of the first, second, and third neighbor base stations 620, 630, and 640 in step 919, and then proceeds to step 921. In step 921, the serving base station 610 determines the second neighbor base station 630 to be a target base station to which the MSS 600 will be handed over with reference to the CINRs of the pilot channel signals and/or Service Level Predictions of all of the first and second neighbor base stations 620 and 630 which are included in the MOB_MSSHO_RSP message, and then proceeds to step 923. In step 923, the serving base station 610 inserts information related to the determined target base station, that is, the second neighbor base station 630, into a MOB_BSHO_RSP message and transmits the MOB_BSHO_RSP message to the MSS 600.

Figure 10:
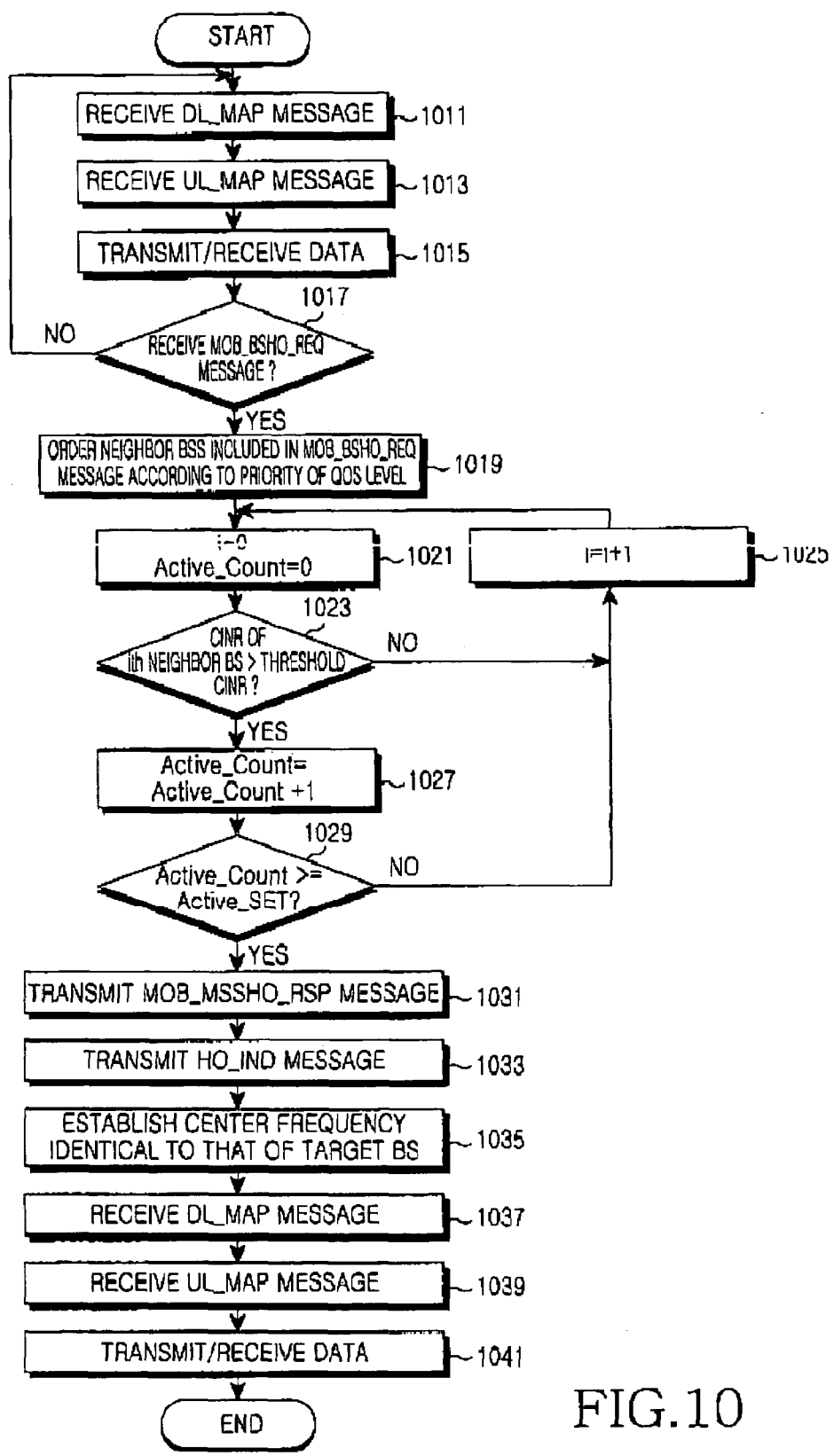
FIG. 10 is a flowchart illustrating an operation procedure of an MSS for performing a handover according to the first embodiment of the present invention.

FIG. 10 is a flowchart illustrating an operation procedure of an MSS for performing a handover according to the first embodiment of the present invention.

First, in step 1011, the MSS 600 receives a DL_MAP message from the serving base station 610 to detect the downlink information and then proceeds to step 1013. In step 1013, the MSS 600 receives an UL_MAP message from the serving base station 610 to detect the uplink information and then proceeds to step 1015. The MSS 600, having detected the downlink and the uplink information in this way, transmits/receives data to/from the serving base station 610 in step 1015 and proceeds to step 1017. In step 1017, the MSS 600 determines whether or not the MSS 600 receives a MOB_BSHO_REQ message from the serving base station 610. As a result of the determination, when the MSS 600 does not receive the MOB_BSHO_REQ message, the MSS 600 returns to step 1011. In contrast, when the MSS 600 receives the MOB_BSHO_REQ message, the MSS 600 proceeds to step 1019.

In step 1019, the MSS 600 orders the neighbor base stations included in the MOB_BSHO_REQ message according to a priority of the QoS levels of the neighbor base stations and then proceeds to step 1021. In step 1021, the MSS 600 initializes the value of parameter 'i' (representing the number of neighbor base stations) to zero, initializes the value of parameter 'Active_Count' to zero, and proceeds to step 1023.

Herein, the Active_Count is a parameter representing the number of neighbor base stations having a CINR exceeding a predetermined threshold CINR from among the neighbor base stations. In step 1023, the MSS 600 determines whether or not the CINR of an i$^{th}$ neighbor base station exceeds the threshold CINR. As a result of the determination, when the CINR of the i$^{th}$ neighbor base station does not exceed the threshold CINR, the MSS 600 proceeds to step 1025. In step 1025, the MSS 600 adds one to the value of parameter 'i' (i=i+1) and then returns to step 1021.

In contrast, when the CINR of the i$^{th}$ neighbor base station exceeds the threshold CINR, the MSS 600 proceeds to step 1027. In step 1027, the MSS 600 adds one to the value of parameter 'Active_Count' (Active_Count=Active_Count+1) and then proceeds to step 1029. In step 1029, the MSS 600 determines whether or not the value of parameter 'Active_Count' is equal to or greater than the value of 'Active_SET' which represents the number of neighbor base stations making up an active set of the MSS 600. As a result of the determination, when the value of parameter 'Active_Count' is less than the value of 'Active_SET' which represents the number of neighbor base stations making up an active set of the MSS 600, the MSS 600 returns to step 1025.

In contrast, when the value of parameter 'Active_Count' is equal to or greater than the value of 'Active_SET', the MSS 600 proceeds to step 1031. The Active_SET is a value established for limiting the number of target base stations. For instance, when the value of the Active_SET is '3' and the number of target base stations to which the MSS 600 can be handed over to is '5', three target base stations from among the five target base stations are selected. In step 1031, the MSS 600 determines a neighbor base station, that is, the second neighbor base station 630, from among neighbor base stations having a CINR exceeding the threshold CINR to be a target base station, transmits an MOB_MSSHO_RSP message including information about the determined target base station to the serving base station 610, and proceeds to step 1033. In step 1033, the MSS 600 transmits an HO_IND message to the serving base station 610 and then proceeds to step 1035.

In step 1035, the MSS 600 changes its center frequency to the frequency of the target base station, that is, the second neighbor base station 630, and then proceeds to step 1037. In step 1037, the MSS 600 receives a DL_MAP message from the second neighbor base station 630 to detect the downlink information and then proceeds to step 1039. In step 1039, the MSS 600 receives an UL_MAP message from the second neighbor base station 630 to detect the uplink information and then proceeds to step 1041. The MSS 600 having detected the downlink and the uplink information in this way transmits/receives data to/from the second neighbor base station 630, thereby ending the handover procedure. Of course, it is possible that the MSS 600 performs a handover to another neighbor base station while the MSS 600 is transmitting/receiving data to/from the second neighbor base station 630. It should be noted that only one handover procedure is illustrated in FIG. 10 for convenience of description.

Figure 11:
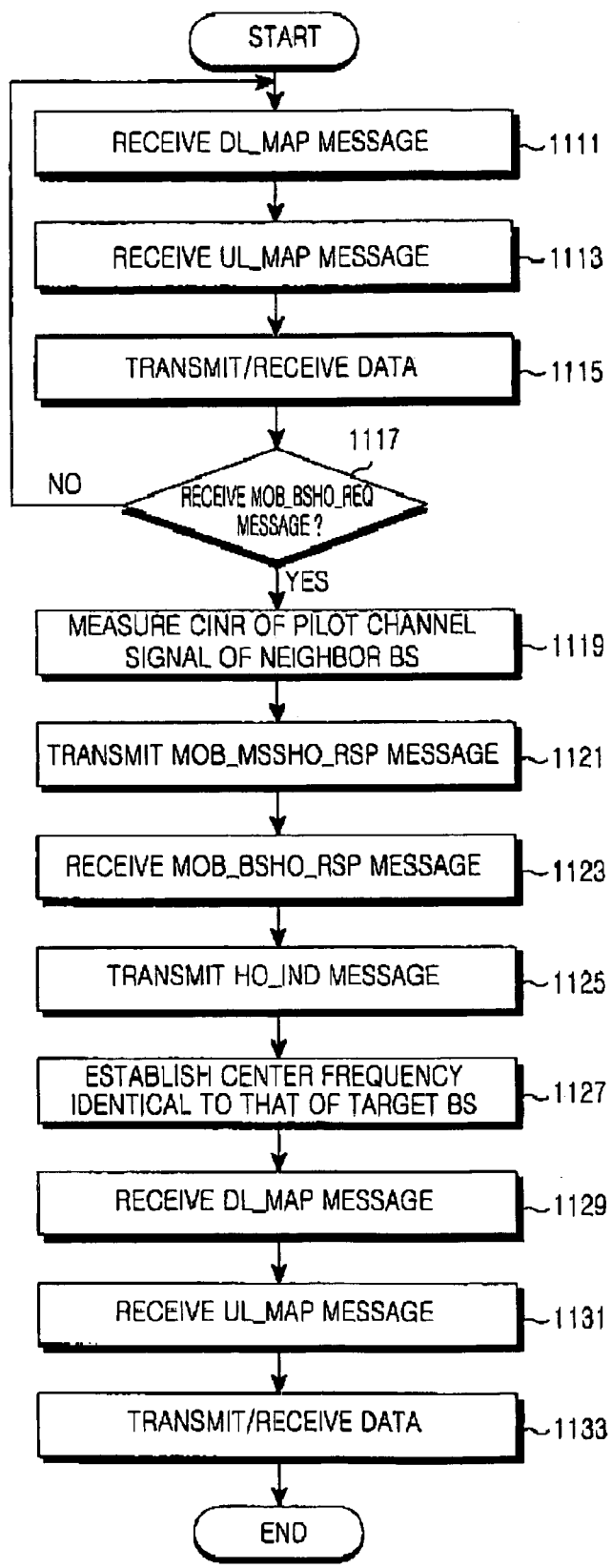
FIG. 11 is a flowchart illustrating the first operation procedure of an MSS for performing a handover according to the second embodiment of the present invention.

FIG. 11 is a flowchart illustrating the first operation procedure of an MSS for performing a handover according to the second embodiment of the present invention.

Referring to FIG. 11, since operations for steps 1111 to 1117 illustrated in FIG. 11 are the same as those of steps 1011 to 1017 described with reference to FIG. 10 and also operations for steps 1125 to 1133 illustrated in FIG. 11 are the same as those of steps 1033 to 1041 described with reference to FIG. 10, a description about these operations will be omitted.

First, as a result of a determination in step 1117, when the MSS 600 receives the MOB_BSHO_REQ message from the serving base station 610, the MSS 600 proceeds to step 1119. In step 1119, the MSS 600 measures the CINRs with respect to neighbor base stations included in the MOB_BSHO_REQ message and then proceeds to step 1121. In step 1121, the MSS 600 transmits an MOB_MSSHO_RSP message including the CINRs measured with respect to the neighbor base stations to the serving base station 610 and then proceeds to step 1123. In step 1123, the MSS 600 receives a MOB_BSHO_RSP message from the serving base station 610 and then proceeds to step 1125. In step 1125, the MSS 600 which detects from the MOB_BSHO_RSP message information related to a target base station, that is, the second neighbor base station 630, to which the MSS 600 will be handed over, transmits an HO_IND message to the serving base station 610, and then proceeds to step 1127. Of course, it is possible that the MSS 600 performs a handover to another neighbor base station while the MSS 600 is transmitting/receiving data to/from the second neighbor base station 630. It should be noted that only one handover procedure is illustrated in FIG. 11 for convenience of description.

Figure 12:
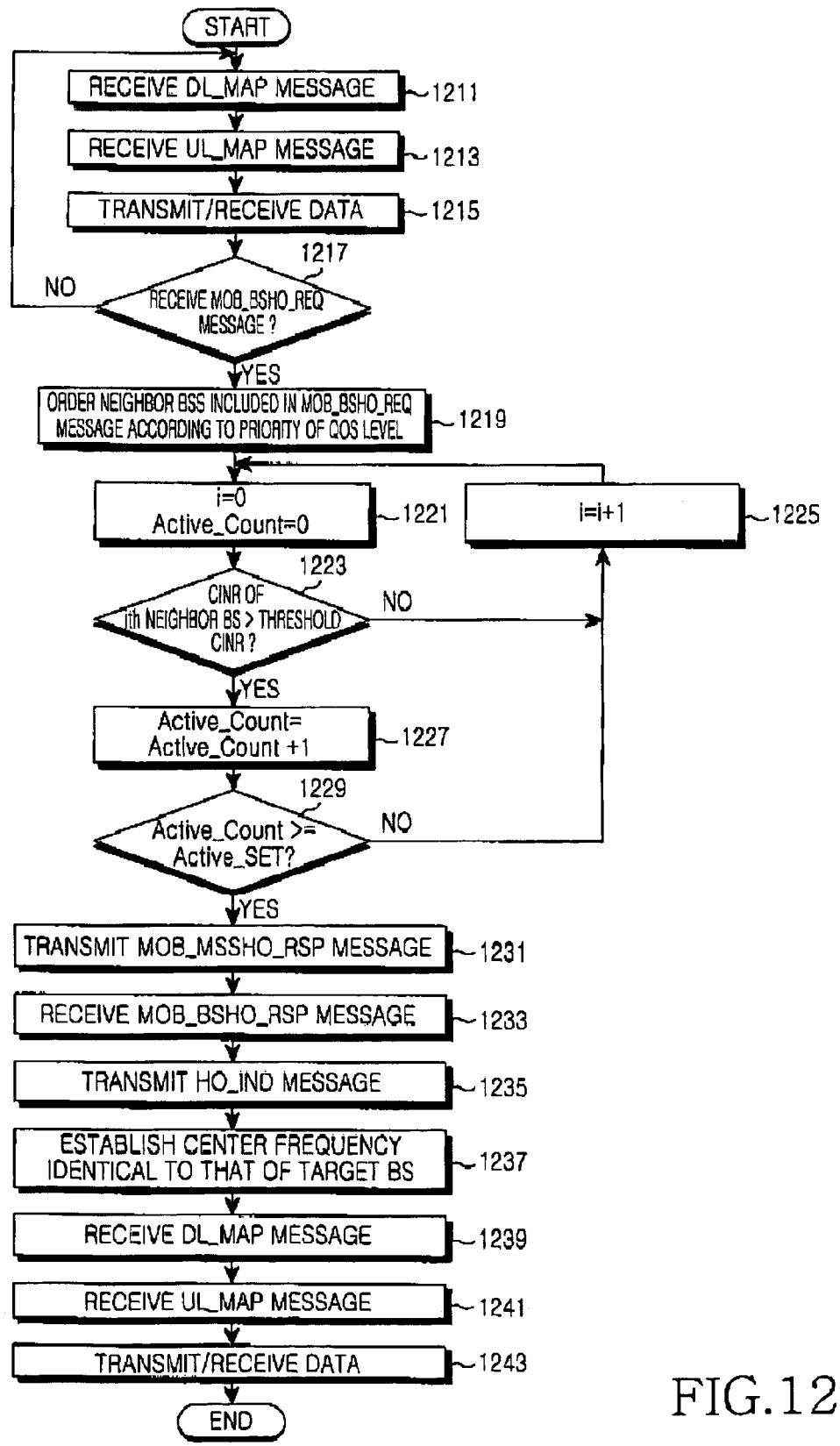
FIG. 12 is a flowchart illustrating the second operation procedure of an MSS for performing a handover according to the second embodiment of the present invention.

FIG. 12 is a flowchart illustrating the second operation procedure of an MSS for performing a handover according to the second embodiment of the present invention.

Since operations for steps 1211 to 1229 illustrated in FIG. 12 are the same as those of steps 1011 to 1029 described with reference to FIG. 10 and also operations for steps 1235 to 1243 illustrated in FIG. 12 are the same as those of steps 1033 to 1041 described with reference to FIG. 10, a description about these operations will be omitted.

First, in step 1231, the MSS 600 transmits to the serving base station 610 an MOB_MSSHO_RSP message including the information related to the neighbor base stations having a CINR exceeding the threshold CINR and then proceeds to step 1233. Herein, according to the embodiment illustrated in FIG. 11, the MSS 600 transmits an MOB_MSSHO_RSP message including the CINRs with respect to all neighbor base stations to which the MSS 600 can be handed over to the serving base station 610, but according to the embodiment illustrated in FIG. 12, the MSS 600 transmits to the serving base station 610 an MOB_MSSHO_RSP message including the CINRs with respect to only the neighbor base stations having a CINR exceeding the threshold CINR, from among all of the neighbor base stations to which the MSS 600 can be handed over. This is a difference between the two embodiment illustrated in FIGS. 11 and 12. In step 1233, the MSS 600 receives a MOB_BSHO_RSP message from the serving base station 610 to detect the information related to a target base station and then proceeds to step 1235. Of course, it is possible that the MSS 600 performs a handover to another neighbor base station while the MSS 600 is transmitting/receiving data to/from the second neighbor base station 630. Herein, it should be noted that only one handover procedure is illustrated in FIG. 12 for convenience of description.

As described above, since the system and the method according to the present invention allows a handover of an MSS to be controlled according to the request of a serving base station, it is possible to distribute the load of the serving base station, thereby improving the performance of the system. When the load concentrated on a specific base station is distributed to a plurality of base stations, the performance of the system is improved. In addition, when the serving base station controls a handover of the MSS, the serving base station notifies the MSS of the neighbor base stations to which the MSS can be handed over, so that the present invention has an advantage of minimizing load and power consumption caused by scanning pilot channel signals in the MSS.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling a handover of a mobile subscriber station by a serving base station in a broadband wireless access communication system which includes the mobile subscriber station, the serving base station for providing service to the mobile subscriber station, and neighbor base stations neighboring the serving base station, the method comprising the steps of:

determining to perform a handover of the mobile subscriber station;

sending to the neighbor base stations a first information related to types of service provided from the serving base station to the mobile subscriber station after determining to perform the handover of the mobile subscriber station;

receiving from the neighbor base stations a second information related to types of service which can be provided by the neighbor base stations to the mobile subscriber station;

transmitting to the mobile subscriber station a handover request signal, which contains an third information determined by reference to the second information received from the neighbor base stations;

receiving from the mobile subscriber station a handover response signal indicating one neighbor base station selected by the mobile subscriber station among the neighbor base stations; and sending a handover notification confirm signal to the selected neighbor base station;

wherein the third information signifies service level prediction information, which corresponds to any one service level prediction information from among a first service level prediction information is possible to provide all of services, a second service level prediction information is possible to provide a portion of the services and an third service level prediction information is not possible to provide any of the services in corresponding neighbor base station, and the mobile station performs the handover to the selected neighbor base station, and ranging with the selected neighbor base station through a predetermined frequency band.

2. The method as claimed in claim 1, wherein the step of determining to perform a handover of the mobile subscriber station is performed when a load for a current service is equal to or greater than a predetermined load.

3. The method as claimed in claim 1, wherein the second information received from the neighbor base stations includes information related to a quantity of service which can be provided by the neighbor base stations at a service quality level equal to that of the service currently being provided to the mobile subscriber station.

4. A method for controlling a handover of a mobile subscriber station in a broadband wireless access communication system which includes the mobile subscriber station, a serving base station for providing service to the mobile subscriber station, and neighbor base stations neighboring the serving base station, the method comprising the steps of:

receiving from the serving base station a handover request signal, which contains information received from the neighbor base stations;

selecting one neighbor base station from among the neighbor base stations based on the received information;

transmitting a handover start signal to the serving base station; and performing the handover to the selected neighbor station and ranging with the selected neighbor base station through a predetermined frequency band, wherein the information signifies service level prediction information which corresponds to any one service level prediction information from among a first service level prediction information is possible to provide all of services, a second service level prediction information is possible to provide a portion of the services and an third service level prediction information is not possible to provide any of the services in corresponding neighbor base station.

5. The method as claimed in claim 4, wherein the information received from the neighbor base stations includes information related to types of service which can be provided by the neighbor base stations.

6. The method as claimed in claim 4, wherein the step of selecting one neighbor base station is based on channel states of the respective neighbor base stations and service levels which can be provided by the respective neighbor base stations, with reference to the information related to the neighbor base stations received from the serving base station.

7. The method as claimed in claim 4, wherein the step of selecting one neighbor base station further comprises the steps of:

measuring CINRs (Carrier to Interference and Noise Ratios) of pilot channel signals received from the neighbor base stations which are determined as neighbor base stations to which the mobile subscriber station can be handed over;

selecting from among the neighbor base stations to which the mobile subscriber station can be handed over neighbor base stations from which a CINR exceeding a predetermined threshold CINR is measured; and selecting one neighbor base station based on information related to services which can be provided by the selected neighbor base stations and the CINRs with respect to the selected neighbor base stations.

8. A method for controlling a handover of a mobile subscriber station by a serving base station in a broadband wireless access communication system which includes the mobile subscriber station, the serving base station for providing service to the mobile subscriber station, and neighbor base stations neighboring the serving base station, the method comprising the steps of:

determining to perform a handover of the mobile subscriber station;

sending to the neighbor base stations a first information related to types of the service provided from the serving base station to the mobile subscriber station after determining to perform the handover of the mobile subscriber station;

receiving from the neighbor base stations a second information related to types of service which can be provided by the neighbor base stations;

transmitting to the mobile subscriber station a handover request signal, which contains an third information determined by reference to the second information received from the neighbor base stations;

receiving a response signal from the mobile subscriber station in response to the handover request signal; and sending a handover notification confirm signal to a neighbor base station selected based on the third information, wherein the mobile station performs the handover to the selected neighbor base station and ranging with the selected neighbor base station through a predetermined frequency band.

9. The method as claimed in claim 8, wherein the step of determining to perform a handover of the mobile subscriber station is performed when a load for current service is equal to or greater than a predetermined load.

10. The method as claimed in claim 8, wherein the second information received from the neighbor base stations includes information related to a quantity of service which can be provided by the neighbor base stations at a service quality level equal to that of the service being currently provided to the mobile subscriber station.

11. The method as claimed in claim 8, wherein the step of selecting one neighbor base station is performed based on channel states of the respective neighbor base stations and service levels which can be provided by the respective neighbor base stations, with reference to the second information related to the neighbor base stations received from the mobile subscriber station.

12. The method as claimed in claim 8, wherein the step of selecting one neighbor base station comprises the steps of:

detecting CINRs (Carrier to Interference and Noise Ratios) of pilot channel signals measured by the mobile subscriber station, the pilot channel signals being transmitted from the respective neighbor base stations;

selecting neighbor base stations, to which the mobile subscriber station can be handed over, from which a CINR exceeding a predetermined threshold CINR is measured; and selecting one neighbor base station based on the information related to services which can be provided by the selected neighbor base stations and the CINRs with respect to the selected neighbor base stations.

13. The method as claimed in claim 8, further comprising the step of transmitting to the mobile subscriber station a identifier information of the selected one neighbor base station.

14. A method for controlling a handover of a mobile subscriber station in a broadband wireless access communication system which includes the mobile subscriber station, a serving base station for providing service to the mobile subscriber station, and neighbor base stations neighboring the serving base station, the method comprising the steps of:

receiving from the serving base station a handover request signal, which contains a first information received from the neighbor base stations;

transmitting to the serving base station a response signal in response to the handover request signal;

receiving from the serving base station information related to a neighbor base station to which the mobile subscriber station is handed over;

transmitting to the serving base station a handover start; and performing the handover to the selected neighbor base station and ranging with the selected neighbor base station through a predetermined frequency band, wherein the first information signifies service level prediction information which corresponds to any one service level prediction information from among a first service level prediction information is possible to provide all of services, a second service level prediction information is possible to provide a portion of the services and an third service level prediction information is not possible to provide any of the services in corresponding neighbor base station.

15. The method as claimed in claim 14, wherein the first information received from the neighbor base stations includes base station identifiers representing the respective neighbor base stations and information related to a quantity of service which can be provided by the neighbor base stations, to which the mobile subscriber station can be handed over, at a service quality level at least equal to that of the service being currently provided to the mobile subscriber station.

16. The method as claimed in claim 14, wherein the step of transmitting the response signal to the serving base station in response to the handover request signal further comprises the steps of:

measuring CINRs (Carrier to Interference and Noise Ratios) of pilot channel signals received from the neighbor base stations and detecting channel states;

selecting neighbor base stations from which a CINR exceeding a predetermined threshold CINR is measured, from among the neighbor base stations to which the mobile subscriber station can be handed over, and transmitting to the serving base station in response to the handover request signal a response signal, that includes CINRs with respect to the selected neighbor base stations to which the mobile subscriber station can be handed over and information about service to be provided by the selected neighbor base stations.

17. A system for controlling a handover of a mobile subscriber station by a serving base station in a broadband wireless access communication system which includes the mobile subscriber station, the serving base station for providing service to the mobile subscriber station, and neighbor base stations neighboring the serving base station, the system comprising:

a serving base station for determining to perform a handover of a mobile subscriber station, sending a first information related to service including types of service provided to the mobile subscriber station, receiving a second information related to types of service which can be provided by the neighbor base stations from the neighbor base stations, transmitting to the mobile subscriber station a handover request signal which contains an third information received from the neighbor base stations, receiving one neighbor base station selected by the mobile subscriber station from among the neighbor base stations, and confirming a handover notification to the selected neighbor base station; and a mobile subscriber station for receiving from the serving base station a handover request signal containing the third information, selecting one neighbor base station from among the neighbor base stations based on the received the third information and transmitting the selected neighbor base station to the serving base station, and transmitting a handover start signal to the serving base station and performing the handover to the selected neighbor base station, wherein the third information signifies service level prediction information, which corresponds to any one service level prediction information from among a first service level prediction information is possible to provide all of services, a second service level prediction information is possible to provide a portion of the services and an third service level prediction information is not possible to provide any of the services in corresponding neighbor base station, and the mobile station performs the handover to the selected neighbor base station, and ranging with the selected neighbor base station through a predetermined frequency band.

18. The system as claimed in claim 17, wherein the second information received from the neighbor base stations by the serving base station includes information related to a quantity of service which can be provided by the neighbor base stations at a service quality level at least equal to that of the service being currently provided to the mobile subscriber station, wherein the third information indicates the quantity of service which can be provided by the neighbor base stations from among the services currently being provided to the mobile subscriber station.

19. The system as claimed in claim 17, wherein the serving base station determines to a handover the mobile subscriber station when a load for service being currently provided by the serving base station is equal to or greater than a predetermined load.

20. The system as claimed in claim 17, wherein the mobile subscriber station measures CINRs (Carrier to Interference and Noise Ratios) of pilot channel signals received from the neighbor base stations to detect channel states, and selects one neighbor base station to which the mobile subscriber station is handed over based on the CINRs measured with respect to the neighbor base stations to which the mobile subscriber station can be handed over and the service information.

21. The system as claimed in claim 17, wherein the mobile subscriber station measures CINRs (Carrier to Interference and Noise Ratios) of pilot channel signals received from the respective neighbor base stations to which the mobile subscriber station can be handed over, selects neighbor base stations from which a CINR exceeding a predetermined threshold CINR is measured from among the neighbor base stations to which the mobile subscriber station can be handed over, and then selects one neighbor base station based on information related to service which can be provided by the selected neighbor base stations and the CINRs with respect to the selected neighbor base stations.

22. A system for controlling a handover of a mobile subscriber station by a serving base station in a broadband wireless access communication system which includes the mobile subscriber station, the serving base station for providing service to the mobile subscriber station, and neighbor base stations neighboring the serving base station, the system comprising:

a serving base station for determining to perform a handover of a mobile subscriber station, sending a first information related to types of service provided to the mobile subscriber station, receiving a second information related to types of service which can be provided by the neighbor base stations from the neighbor base stations, transmitting to the mobile subscriber station a handover request signal which contains an third information received from the neighbor base stations, receiving a response signal from the mobile subscriber station in response to the handover request signal, selecting one neighbor base station based on the third information, and confirming a handover notification to the selected neighbor base station; and a mobile subscriber station for receiving from the serving base station a handover request signal, which contains the second information received from the neighbor base stations, transmitting a response signal to the serving base station in response to the handover request signal, receiving from the serving base station the third information related to a neighbor base station to which the mobile subscriber station is handed over, transmitting a handover start signal to the serving base station, performing the handover to a selected neighbor base station, and ranging with the selected neighbor base station through a predetermined frequency band, wherein the third information signifies service level prediction information, which corresponds to any one service level prediction information from among a first service level prediction information is possible to provide all of services, a second service level prediction information is possible to provide a portion of the services and an third service level prediction information is not possible to provide any of the services in corresponding neighbor base station.

23. The system as claimed in claim 22, wherein the mobile subscriber station detects channel states by measuring CINRs (Carrier to Interference and Noise Ratios) of pilot channel signals received from the respective neighbor base stations to which the mobile subscriber station can be handed over, selects neighbor base stations from which a CINR exceeding a predetermined threshold CINR is measured from among the neighbor base stations to which the mobile subscriber station can be handed over, and then transmits to the serving base station in response to the handover request a response including CINRs with respect to the selected neighbor base stations to which the mobile subscriber station can be handed over.

24. The method as claimed in claim 1, wherein the first information signifies required QoS (Quality of Services) information.

25. The method as claimed in claim 1, wherein the second information signifies QoS (Quality of Services) Estimated information.

26. The method as claimed in claim 10, wherein the first information signifies required QoS (Quality of Services) information.

27. The method as claimed in claim 10, wherein the second information signifies QoS (Quality of Services) Estimated information.

28. The method as claimed in claim 21, wherein the first information signifies required QoS (Quality of Services) information.

29. The method as claimed in claim 21, wherein the second information signifies QoS (Quality of Services) Estimated information.

30. The method as claimed in claim 28, wherein the first information signifies required QoS (Quality of Services) information.

31. The method as claimed in claim 28, wherein the second information signifies QoS (Quality of Services) Estimated information.

* * * * *